(12) United States Patent
Yamaguchi et al.

(10) Patent No.: US 6,543,424 B1
(45) Date of Patent: Apr. 8, 2003

(54) FUEL PUMP, IN-CYLINDER DIRECT INJECTION TYPE INTERNAL COMBUSTION ENGINE USING THE SAME AND SURFACE TREATMENT METHOD

(75) Inventors: Shizuka Yamaguchi, Hitachinaka (JP); Noboru Baba, Hitachiota (JP); Katsuyoshi Terakado, Urizura-machi (JP); Arata Kagiyama, Naka-machi (JP); Hideki Machimura, Hitachinaka (JP); Yukio Takahashi, Hitachinaka (JP); Yoshinobu Ono, Yokohama (JP); Kazuo Ojima, Hitachinaka (JP); Masayoshi Kotaki, Hitachinaka (JP); Hiroyuki Yamada, Hitachinaka (JP); Atsuji Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 09/637,679

(22) Filed: Aug. 14, 2000

(30) Foreign Application Priority Data

Aug. 12, 1999  (JP) ............................................. 11-228251

(51) Int. Cl.[7] ............................................. F02M 59/44
(52) U.S. Cl. ....................................... 123/495; 417/269
(58) Field of Search .................................. 123/495, 507, 123/508; 417/269

(56) References Cited

U.S. PATENT DOCUMENTS

| | | | | |
|---|---|---|---|---|
| 5,782,161 A | * | 7/1998 | Okubo et al. | ................... 92/71 |
| 6,074,175 A | * | 6/2000 | Hoshi et al. | ................. 417/269 |
| 6,227,167 B1 | * | 5/2001 | Smith et al. | ................. 123/446 |
| 6,237,441 B1 | * | 5/2001 | Nishioka et al. | ............... 74/569 |

FOREIGN PATENT DOCUMENTS

| | | | | |
|---|---|---|---|---|
| DE | 10039169 | * | 3/2001 | .......... F02M/59/44 |
| JP | 55-117068 | | 9/1980 | |
| JP | 8-35075 | | 2/1996 | |
| JP | 9-236080 | | 9/1997 | |
| JP | 10-318091 | | 12/1998 | |
| JP | 351096 | * | 12/1999 | .......... F02M/59/44 |
| JP | 3839 | * | 1/2001 | .......... F02M/59/44 |

* cited by examiner

Primary Examiner—Henry C. Yuen
Assistant Examiner—Hai Huynh
(74) Attorney, Agent, or Firm—Crowell & Moring LLP

(57) ABSTRACT

In a fuel pump pressurizing fuel and supplying the fuel to a fuel injection valve of a vehicle engine, a hardened layer of at least one selected from a nitride layer, a carburated and quenched layer and a carbonitrided layer, and a metal compound layer, on a surface of the hardened layer, higher in corrosion resistance than the hardened layer are formed on one of slide surfaces contacting each other and sliding in fuel.

15 Claims, 23 Drawing Sheets

(a) INTAKE STROKE (b) DELIVERY STROKE (a) PROCESS (b) PROCESS (a)

(b)

TEST POTENTIAL : 70°C
TEST SOLUTION : E13.5vol % + BASE ACID CONCENTRATION+$H_2O$ BASE ACID CONCENTRATION ··· CHLORINE ION : 5ppm
SULFURIC ACID ION : 6ppm
NITRIC ACID ION : 6ppm
ACETIC ACID ION : 61ppm
FORMIC ACID ION : 46ppm a) SKD61 b) SUS420J2 c) SUS403

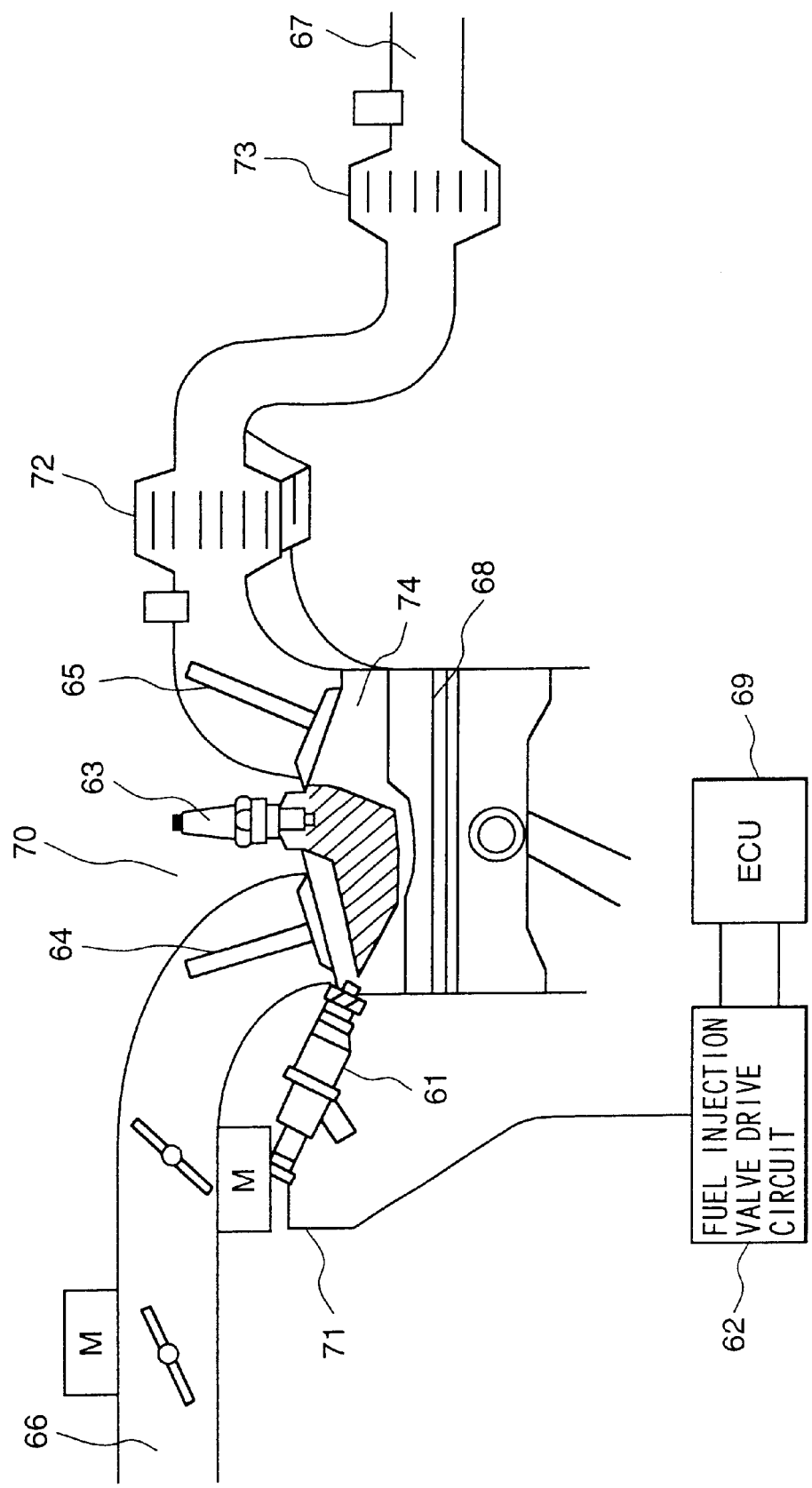

FUEL PUMP, IN-CYLINDER DIRECT INJECTION TYPE INTERNAL COMBUSTION ENGINE USING THE SAME AND SURFACE TREATMENT METHOD

BACKGROUND OF THE INVENTION

The present invention relates to a fuel pump for fuel supply in an internal combustion engine and, more particularly, to a fuel pump as a high pressure pump of a fuel injector for a direct injection engine of a vehicle, directly injecting fuel into a combustion chamber from a fuel injection valve mounted on the combustion chamber of the vehicle engine, a direct injection engine employing the fuel pump and a surface treatment method for the fuel pump.

In recent years, in internal combustion engines, particularly, in gasoline engines for vehicles, it is desired to adopt cylinder fuel direct injection apparatus to improve fuel consumption characteristics, reduce emission of harmful exhaust gas, improve operation responsiveness such as accelerative characteristics, etc.

For the cylinder fuel direct injection apparatus, since gasoline is necessary to be directly injected into the cylinder of internal combustion engine even during compression stroke, a high pressure fuel pump which is able to supply gasoline at a high pressure of 3 MPa or more is required.

As a type of the high pressure fuel pump, there is a swash plate type axial plunger pump of type in which rotation of a swash plate driven by a shaft is converted into a swing motion by a swing plate, fluid is taken in, pressurized and delivered at a high pressure by a plunger reciprocating by the swing motion of the swing plate, in a housing.

This type of high pressure fuel pump is disclosed in JP A 9-236080, which fuel pump has a shaft transmitting driving force from outside, a swash plate rotated by the shaft, a swing plate converting the rotation of the swash plate into swing motion, a plurality of pistons reciprocating by the swing motion of the swing plate, a partition bellows for dividing a crank chamber accommodating the above-mentioned swash plate, a swing plate and pistons into a fuel chamber and a mechanism chamber, and in which a bearing portion transmitting driving force between the shaft and the swash plate and a bearing portion transmitting driving force between the swash plate and the swing plate are arranged in the mechanism chamber to lubricate the bearing portions with oil, and the above-mentioned plurality of pistons are arranged in the fuel chamber, whereby the pistons take in and deliver fuel.

In this high pressure fuel pump, when it is used for gasoline supply, oil of high viscosity excellent in lubrication can not be used in the mechanism chamber raising the pressure of gasoline, because there is a fear that the oil of high viscosity mixes with fuel, which affects combustion. Therefore, the crank chamber is divided into the fuel chamber and the mechanism chamber by the partition bellows.

That is, in the mechanism chamber, high viscosity oil excellent in lubrication is sealed as lubrication oil to improve wear resistance, whereby measures against wear, etc. between sliding surfaces of respective parts of the mechanism are taken.

On the other hand, in the fuel chamber of a mechanism portion generating high pressure with this construction, fuel is taken in and delivered by movement of the plurality of pistons reciprocating by swing motion of the swing plate, whereby the fuel is made high in pressure. Therefore, only gasoline of fuel exists as fluid in the fuel chamber. Therefore, the gasoline acts as lubrication oil on sliding portions of respective mechanism portions.

Further, as another type of high pressure fuel pump, a radial plunger high pressure fuel pump is disclosed in JP 10-318091. The fuel pump disclosed therein has a shaft transmitting driving force of an engine, a driving cam converting rotation of the shaft into swing motion, a plunger reciprocating through a lifter by the rotation of the driving cam and a cylinder bore taking in and delivering fuel in combination with the plunger.

In those fuel pumps, pump portions (pressurizing portions) inside the fuel chamber come necessarily to sliding under high surface pressure in fuel (gasoline), therefore, the portions are considered as main portions worn by wear because they are sliding in contact with each other.

In the mechanism portion raising pressure of fuel (gasoline) in the pump portions inside the fuel chamber, when gasoline is used as lubrication oil, it is considered that sliding portions are easily worn in the sliding mechanism portion because the viscosity of gasoline is extremely lower than usual lubrication oil.

Further, in some cases, gasoline having methyl alcohol and/or ethyl alcohol added thereto, or detracted gasoline, or the like is used as fuel. When such gasoline is used, in some cases, surroundings are apt to oxidation and wear takes place, with the gasoline mixed with water, acid components, etc. In such case, contacting portions of sliding mechanisms are to be placed in a circumstance more severe for wear and tear and it is considered that a quantity of wear and tear becomes large.

When the contact portions of slide mechanisms wear and a quantity of wear and tear increases, the efficiency of intake and delivery is likely to be reduced and the reliability is considered to be detracted.

Therefore, for each part of the slide mechanisms, durability, particularly, wear resistance and corrosion resistance in fuel with less lubrication property or in fuel mixed with acid components are required.

Further, JP A 8-35075 discloses an ion nitride layer and formation of, thereon, a surface-hardened layer composed of nitride, carbide and carbonitride of at least one kind of Ti, Zr, Hf, V, Nb, Ta and Cr by a PVD method, however, it does not disclose any specific use and any specific problem in the specific use.

Further, JP A 55-117068 discloses formation of a surface hardened layer of carburizing, nitriding, etc. on an inner surface of a fuel injection hole, and a harder coating layer than the surface hardened layer on the surface hardened layer by a CVD method (chemical vapor deposition method). JP A 55-117068 discloses, as a subject, wear and corrosion due to contact between a fluid and a solid, however, it does not touch a specific subject in the case where it is used for a fuel pump.

SUMMARY OF THE INVENTION

An object of the present invention is to provide a fuel pump, of which slide mechanism parts in a fuel chamber are excellent in wear resistance and corrosion resistance in fuel of detracted lubricative property or in fuel mixed with acid components, and a direct injection engine using the fuel pump.

The present invention resides in a fuel pump, transferring fuel to a fuel injection valve and characterized in that a film having corrosion resistance and wear resistance is formed a surface of at least one of parts contacting with each other and sliding.

The present invention resides in a fuel pump which pressurizes fuel and supplies it to a fuel injection valve of a vehicle engine.

The present invention resides in a fuel pump which pressurizes fuel and supplies it to a fuel injection valve of a vehicle engine, and which is characterized in that a surface-hardened layer comprising one of a nitride layer, a carburized and quenched layer and a carbonitrided layer, and a metal compound layer formed on the surface-hardened layer and having a higher corrosion resistance to the fuel than the surface-hardened layer is formed on at least one of sliding surfaces contacting with each other and sliding through the fuel, or the above-mentioned surface-hardened layer is formed on at least one of slide surfaces contacting with each other and sliding through lubrication oil.

The present invention resides in a fuel pump which comprises, inside a housing, a shaft transmitting rotation from outside, a swash plate converting rotation of the shaft into a swinging motion and a plunger reciprocated in a cylinder by the swinging motion of the swash plate through a slipper, and pressurizes fuel and supplies the fuel to a fuel injection valve of a vehicle engine, and which is characterized in that a surface-hardened layer comprising one of a nitride layer, a carburized and quenched layer and a carbonitrided layer, and a metal compound layer formed on the surface-hardened layer and having a higher corrosion resistance to the fuel than the surface-hardened layer is formed on at least one of sliding surfaces of the plunger and cylinder, contacting with each other and sliding, or the above-mentioned surface-hardened layer is on sliding surfaces of the swing plate and slipper, contacting with each other and sliding.

The present invention resides in a fuel pump which comprises, inside a housing, a swash plate rotating through a shaft transmitting rotation from outside, a swing plate swinging by rotation of the swash plate and a plunger reciprocating in a cylinder through a slipper by rotation of the swing plate, and pressurizes fuel and supplies the fuel to a fuel injection valve of a vehicle engine, and which is characterized in that a surface-hardened layer comprising one of a nitride layer, a carburized and quenched layer and a carbonitrided layer, and a metal compound layer formed on the surface-hardened layer and having a higher corrosion resistance to the fuel than the surface-hardened layer is formed on at least one of sliding surfaces of the plunger and cylinder, contacting with each other and sliding, or further the above-mentioned surface-hardened layer is formed on slide surfaces of the swing plate and slipper, contacting with each other and sliding.

The present invention resides in a fuel pump which comprises a shaft rotating by driving of an engine, a cam rotating by rotation of the shaft and a plunger reciprocating in a cylinder by rotation of the cam, and pressurizes fuel and supplies the fuel to a fuel injection valve of a vehicle engine, and which is characterized in that a surface-hardened layer comprising one of a nitride layer, a carburized and quenched layer and a carbonitrided layer, and a metal compound layer formed on the surface-hardened layer and having a higher corrosion resistance to the fuel than the surface-hardened layer is formed on at least one of sliding surfaces of the plunger and cylinder, contacting with each other and sliding.

The present invention resides in a direct injection engine which comprises fuel injection means for directly injecting fuel into a combustion chamber and a fuel pump supplying the fuel to said fuel injection means, and which is characterized in that said fuel pump is any one of the fuel pumps as described above.

For the surface-hardened layer according to the present invention, it is preferable to perform, after surface treatment, a treatment of heating at a higher temperature than the surface treatment to cause weak compounds to disappear. The diffusion surface treatment is performed for a nitride layer, a carbonitrided layer, a soft nitride layer, a salt bath soft nitride layer, a carburized and quenched layer or a layer made of two or more of those layers. Particularly, the diffusion treatment is performed for a nitride layer because it is treated at a low temperature of about 500° C., whereby a weak compound layer is formed.

A hard film of corrosion resistance and wear resistance according to the present invention is preferable to be a film formed by ion-plating a metal compound selected from carbide, nitride and caronitride.

Tool steels, stainless steels, alloy steels and bearing steels can be used for slide portions contacting with each other and sliding, in the present invention.

In the present invention, a diffusion surface treatment layer and a hard layer of corrosion resistance and wear resistance are preferable to be formed by continuously treating them in one treatment bath.

$Fe_3N$ (white compound) is preferable not to be formed in a nitride layer of a diffusion surface treatment layer according to the present invention.

A nitride layer as a hardened layer in the present invention is preferable to be formed by introducing hydrogen, nitrogen or hydrogen and ammonia in a vacuum furnace and generating plasma to activate the gas.

The hard film of corrosion resistance and wear resistance according to the present invention is preferable to be formed by a physical gas phase vapor deposition method (PVD method). When a CVD method is used, a treatment temperature becomes high of 700–1100° C., and there is a problem that when a coating layer is formed on a treatment layer such as a nitride layer, carbonitride layer, etc., the treatment layer is heated to be softened or disappear.

For a material for swash plate in the present invention, a surface treatment material of alloy steel for machine structure use or cast iron, and a surface treatment material of the cast iron.

Slipper members according to the present invention are preferable to be made of aluminum alloy, copper alloy, alloy tool steel, stainless steel, or its surface treatment material.

A cylinder according to the present invention is preferable to be made of alloy tool steel or ferrite stainless steel.

In the case where slide portions slide in gasoline of less lubricative property or in fuel in which water and alcohol are present and acid components are mixed in a mechanism part and a pump part for pressurizing fuel and delivering it, material of each slide part, its surface treatment and its combination are optimized.

The diffusion surface treatment layer has an effect that load resistance to a high surface pressure is improved and separation resistance of a hard film also is improved by raising the hardness of a base material and forming a hard film of corrosion resistance and wear resistance. In the diffusion surface treatment layer, there are a nitride layer, a carbonitrided layer, a soft nitride layer and a salt bath nitride layer as nitride for diffusing mainly nitrogen, precipitating fine nitride to raise the hardness in a temperature region in which the property of base material is not damaged. Further, a carburizing and hardening method of diffusing carbon in a high temperature region and quenching thereby to raise the hardness is applied.

Nitrides becomes higher in hardness than a base material by forming nitride by nitride-forming elements, have a property of being difficult to be adhered, and reactivity to friction and wear of the base material is improved. Further, the nitride layer is a treatment layer continued from the base material, so that it has a property that it is difficult to be separated under high surface pressure. The cementation layer can be formed as a deep treatment layer and it has an excellent load resistance when a high surface pressure is applied thereon. Corrosion resistance and wear resistance are improved by properties of the corrosion resistant and wear resistant hard film and the surface diffusion treatment layer.

With the construction, friction resistance is small, and it does not almost occur that a material on one side does not stick or adhere to a material on another side. Therefore, initial wear, steady wear and sticking or the like are prevented. Thereby a fuel pump which is excellent in reliability can be provided.

BRIEF DESCRIPTION OF THE DRAWINGS

FIG. 24 is a construction diagram of a direct gasoline injection engine relating to the present invention.

DESCRIPTION OF EMBODIMENTS OF THE PRESENT INVENTION

Embodiment 1

Figure 1:
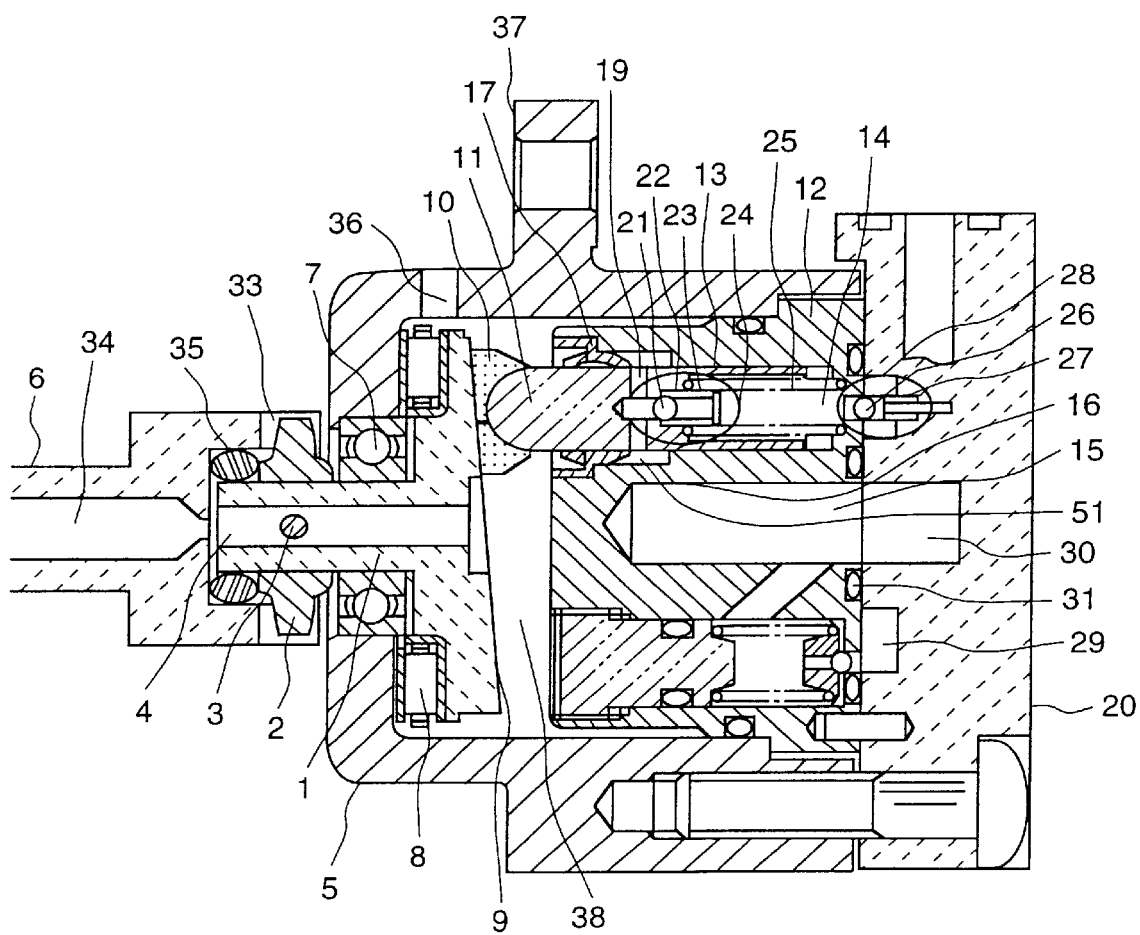
FIG. 1 is a first partial sectional view of a fuel pump of an embodiment of the present invention.

An example of a fuel pump (3 cylinder type) of swash plate type axial plunger is shown in FIGS. 1 to 4.

The swash plate type axial plunger fuel pump comprises a shaft 1 transmitting driving force from an external portion into a housing, a swash plate 9 converting rotation of the shaft 1 into a swinging motion, plungers 11 each reciprocated by the swash plate 9 rotated by the shaft 1 through a slipper 10, and cylinder bores receiving the plungers 11 and tacking in and delivering fuel by reciprocation of the plungers 11. Contact portions between the swash plate 9, the slippers 10 and plungers 11 are lubricated with lubrication oil, and sliding portions between the plungers 11 and the cylinder bores 13 are lubricated with fuel. On a surface of each of the plungers 11 sliding in fuel, there are formed a nitride layer, a carburized and quenched layer, or carbide, nitride and carbon nitride formed on the carburized and quenched layer and the nitride layer.

In the fuel pump, a conventional bellows separating lubrication oil and fuel is unnecessary and seal members are provided at end portions of the sliding portions between the plungers 11 and the cylinder bores 13 to sufficiently lubricate drive mechanism portions whereby the number of members sliding in gasoline is made less.

As shown in FIG. 1, a coupling 2 transmitting driving force from a cam shaft 6 of an engine connects the shaft 1 by a pin fitted in the coupling 2. The swash plate 9 is formed in one end of the shaft 1 as one piece. The swash plate 9 has an oblique plane extending radially at the end thereof on the reverse side to the shaft 1. The swash plate 9 is in contact with the slippers 10 on the oblique plane. Each slipper 10 has a taper formed for assisting oil film formation between the swash plate 9 and the slipper 9 on an outer peripheral portion of the slipper 9 on a swash plate side. The slippers each have a spherical recess portion formed on the side reverse to the side contacting with the swash plate. The spherical recess portions of the slippers 10 receive spherical ends of the plungers 11, whereby the slippers 10 are supported by the plungers 11. Rotation of the swash plate 9 causes the oblique plane to swing, and the swinging motion causes the plungers 11 to reciprocate.

In the fuel pump of this construction, intake and delivery of fuel are as follows.

The plurality of cylinder bores 13 and the plungers 11 form pump chambers 14 inside a cylinder block or cylinder 12. An intake space 15 communicating with each of the plungers 11 is provided in a central portion of the cylinder block 12 and fuel is supplied to the pump chambers 14 through the intake space 15. For introducing fuel into the intake space 15, fuel piping outside the fuel pump is mounted on a rear body 20, and the intake space 15 is arranged to communicate with an intake chamber 30 formed in the rear body 20 at the center thereof to communicate with the fuel piping through an intake passage in the rear body.

An intake valve (check valve 24) taking in fuel is formed in each plunger 11, and the intake valve is composed of a ball 21, a spring 22 and a stopper 23 supporting the spring 22. A plunger spring 25 also is inserted in the plunger 11 for always pressing the plunger 11 to the side of the swash plate 9 to cause the plunger 11 with the slipper 10 to follow the swash plate 9.

A communication passage A 16 to the intake valve 24 in the plunger 11 is formed for communication between a counterbore 51 and the intake space 15. The counterbore 51 has a larger diameter than the diameter of the cylinder bore 13 and such a depth that an introduction hole 19 and the counterbore 51 communicate with each other even when the pump chamber 14 is sufficiently shrunken (a position of the plunger is at an upper dead center) so that fuel can be always supplied into the plunger 11.

Figure 3:
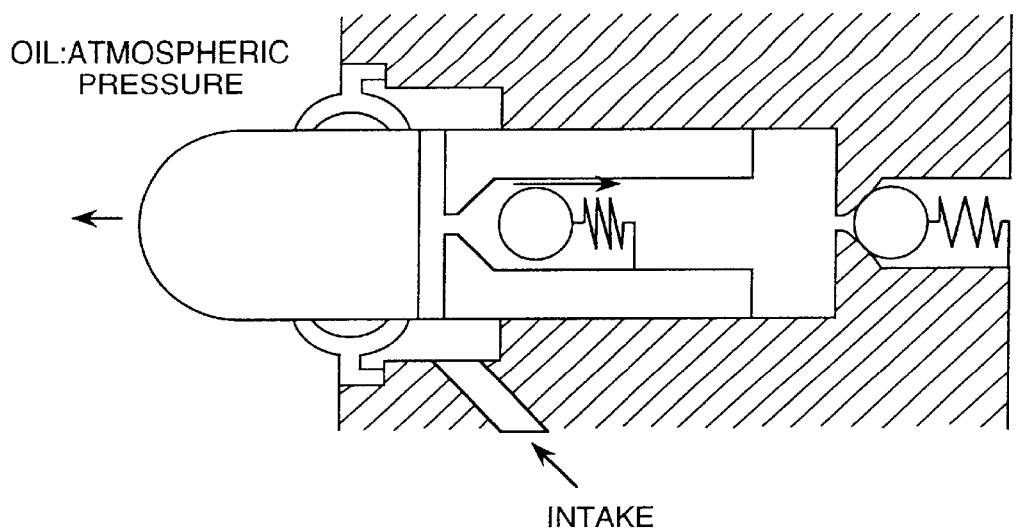
FIG. 3 is views for explaining strokes.
Figure 3:
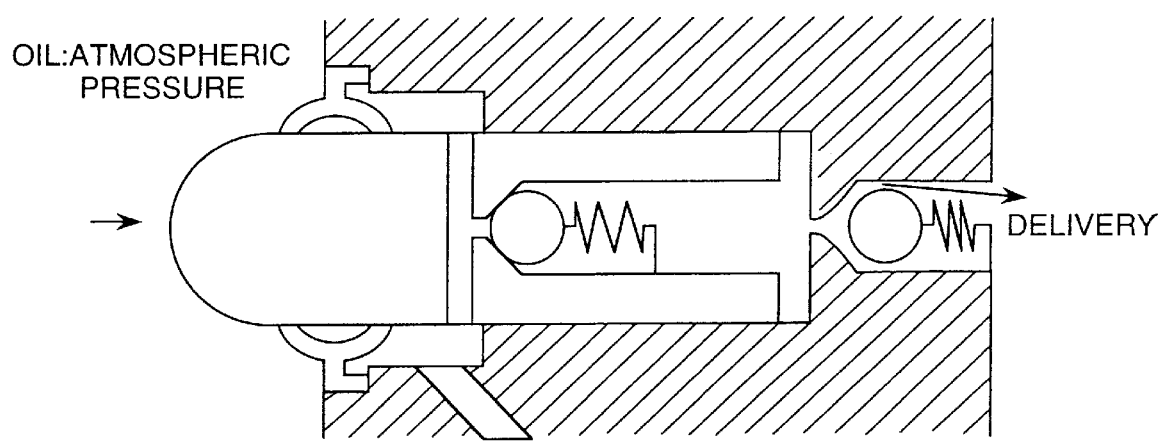

FIG. 3 is an enlarged view of the plunger 11 for explaining strokes.

In an intake stroke (it is a stroke in which the plunger 11 moves so that the space of the pump chamber 14 expands) in FIG. 3(a), the intake valve 24 provided inside the plunger 11 opens to take fuel in the pump chamber 14 when the pressure inside the pump chamber 14 provided in the plunger 11 becomes a prescribed pressure or less. Further, when the pump is shifted from the intake stroke to a delivery stroke (it is a stroke in which the plunger 11 moves so that the space of the pump chamber 14 shrinks) in FIG. 3(b), a delivery pump 28 composed of a ball 26 and a spring 27 opens to deliver fuel from the pump chamber 14 to a delivery chamber 29 formed in the rear body 20 at a time the pump chamber 14 reaches a prescribed pressure in the same manner as the intake valve 24. Here, the intake chamber 30 and delivery chamber 29 each formed in the rear body 20 are separated by an O-ring 31, and the intake chamber 30 is formed at a central side more than the delivery chamber 29, whereby a passage construction of the pump itself is made compact.

Figure 2:
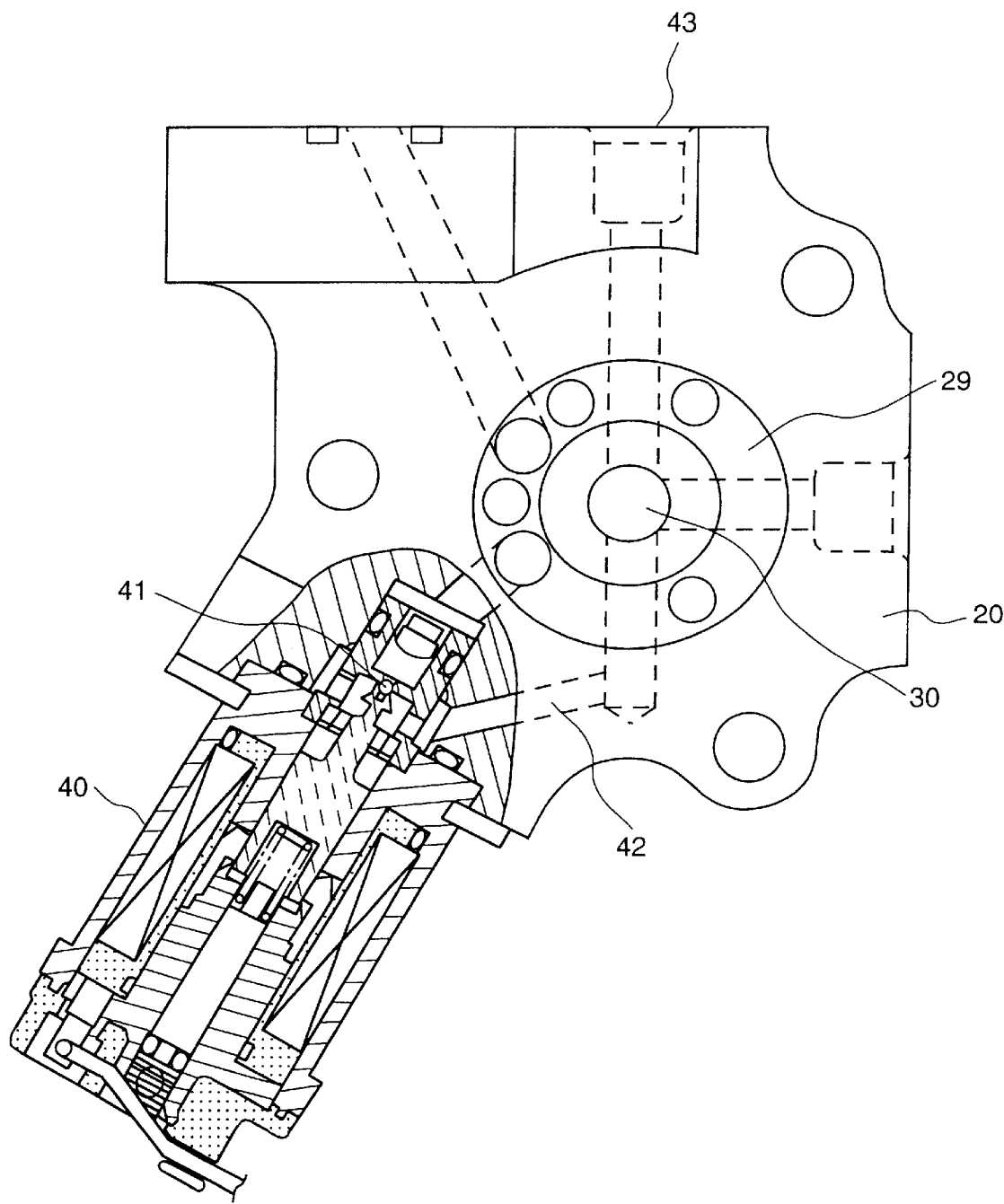
FIG. 2 is a partial sectional view of a passage structure inside a rear body of the first embodiment.

The pressure in the delivery chamber 29 can be controlled to be optimum by a pressure adjusting valve (hereunder, called a pressure regulator) 40 provided on a passage communicating with the delivery chamber 29 as shown in FIG. 2. Control of the delivery pressure is for controlling pressure applied to an injector (not shown) downstream of the delivery side. The high pressure fuel sent from the high pressure chamber to the pressure regulator 40 is returned to the intake chamber 30 through a ball valve 41 provided in the pressure regulator 40 and a communication passage B 42 provided in the rear body 20. An intake passage 43, the intake chamber 30, the intake space 15 and the communication passage A 16 are forms a fuel supply passage for supplying fuel from a fuel source to each cylinder bore.

In this manner, the pressure in the pump chamber 14 changes from an intake pressure (generally, 0.2 MPa to 0.5 MPa) to a high pressure chamber pressure (generally, 3 MPa to 20 MPa). A load due to the fuel pressure in each of the pump chambers 14 is transmitted to the swash plate 9 of the shaft 1 through the plunger 11 and the slipper 10. That is, a resultant force of loads of the plurality of the plungers 11 is applied on the swash plate 9. The resultant force acts on the shaft as an axial load and a radial force depending on an inclination angle of the swash plate. In order to support those forces and attain smooth rotation, the shaft 1 is fitted to a radial bearing 7 and a thrust bearing 8 to support the load on the body 5.

Portions (slipper 10/swash plate 9, slipper 10/plunger spherical recess and bearing portions) supporting those loads are portions for supporting relative velocity due to rotation and load, and sliding friction thereof can be reduced by oil lubrication. Therefore, it is necessary to provide an oil storage structure in a swash plate chamber 38 formed between the body 5 and the cylinder block 12.

In the present embodiment, seals 17 for sealing fuel and oil during reciprocation of the plungers 11 are provided in the cylinder block 12. The seals 17 relatively sliding reciprocatively seal gaps between the plungers 11 and the cylinder bores 13. The seals 17 each are a sealing member for separating fuel and oil. The pressure applied on each seal 17 is always the above-mentioned intake pressure of low pressure because there is the communication passage A 16 between the seal 17 and the pump chamber 14, and high pressure in the high pressure chamber is not applied on the seal 17. Thereby, the durability and reliability of the seals 17 are raised.

Figure 4:
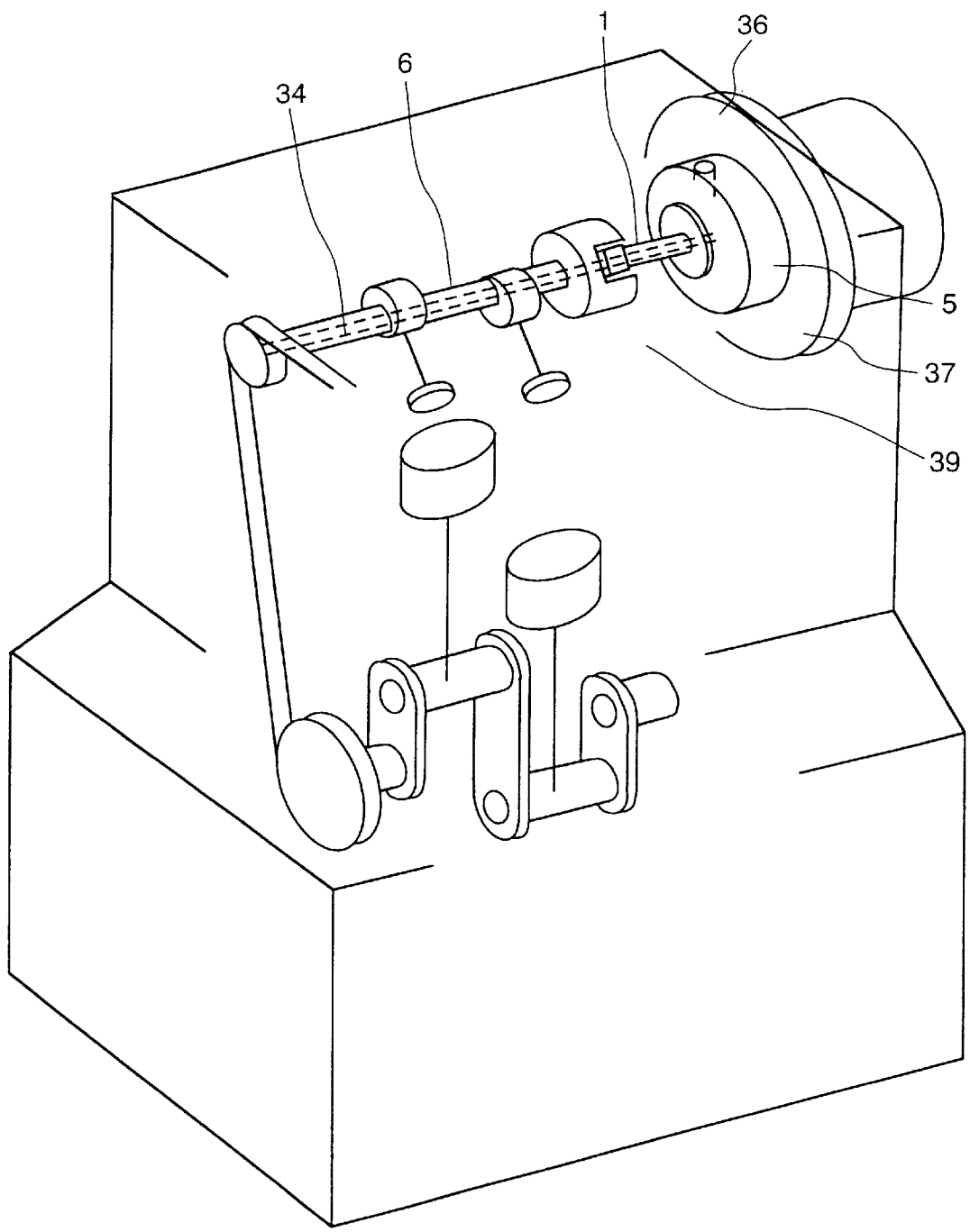
FIG. 4 is a schematic diagram of an engine oil course in the first embodiment.

Next, an oil circulation course and an oil circulation method will be explained, referring to FIG. 4.

The shaft 1 passed through a shaft seal 35 and the coupling 2 is fitted in a coupling fitting portion 33 of the engine cam 6 having an oil passage 34 at a center thereof, and oil from the engine is introduced into the swash chamber 38 through a communication passage 4 provided in the center of the shaft 1 to communicate with the swash plate chamber 38. The shaft seal 35 does not completely seal oil but allows oil to flow into the swash plate chamber 38 at a necessary and minimum flow rate. Thereby, it is possible to extremely suppress for the drive shaft to receive an eccentric load due to eccentricity between the engine cam 6 and the shaft 6, where the durability of the radial bearing 7 is raised. Further, by limiting a quantity of oil flowing into the swash plate chamber 38 to a necessary and minimum quantity, it is achieved to replace the oil diluted by fuel leaked from the seal 17 into the swash plate chamber 38 with the inflow oil, while suppressing temperature elevation of the swash plate chamber 38. Further, by introducing oil from the center of the shaft 1, the oil introduction can be achieved without any new oil passage, so that it is possible to achieve adaptability with the engine and making the engine size compact.

In the present embodiment, oil is introduced through the communication passage C 4 provided at the center of the shaft 1, but any other oil introduction passage is sufficient if they are provided so as to communicate the oil source of the engine and the swash plate chamber 38 of the pump.

Next, an explanation will be taken about a passage for returning the oil supplied from the engine to the swash plate chamber 38 to the engine. The passage is a return passage 36 from the swash plate chamber 38 to an engine cam chamber 39. The return passage 36 is provided on the side of coupling 2 more than a flange surface 37 which is provided in the body 5 of the pump to be mounted on the engine, whereby the oil inside the swash plate chamber 38 can be returned without providing any specific passage on the engine side. The return passage 36 is arranged at a position higher than sliding surfaces of the swash plate 9 and the slippers 10, whereby vapor is discharged from the return passage 36 into the engine cam chamber 39 even if vapor is generated, and the sliding surfaces are always lubricated with lubrication oil. Further, the diameter of the return passage 36 is made larger than that of the passage C 4 for oil introduction. Thereby, a quantity of oil flowing out of the swash plate chamber 38 is made not less than a quantity of oil flowing in so that the pressure in the swash plate chamber 38 does not rise, whereby the reliability of the seal 17 is raised.

The pressure in the swash plate chamber 38 becomes always less than the intake pressure of fuel without rising, whereby the oil is prevented from leaking to the fuel side. Further, at the same time, force toward the wash plate is always applied on the plungers 11 and a load of each plunger spring 25 is reduced.

With the above-mentioned construction, a point which is greatly different from a conventional swash plate type axial plunger pump is that the swash plate and the slippers slide in lubrication oil at a high peripheral speed. The rotation of the swash plate is converted into swinging motion and the plungers are reciprocated thereby. In this case, a seal member is provided between each plunger and each cylinder bore, thereby to separate lubrication oil from fuel, and the number of members sliding in gasoline becomes small.

In the present embodiment, as main members working and sliding in fuel and required for corrosion and wear resistance, there are the plungers which are pressurizing members of the pump chamber and the cylinders having the cylinder bores slidably supporting the plungers. Particularly, a diametric gap between the plunger and the cylinder bore is made 10 μm or less to make leakage of oil from the pressurizing chamber minimum. Therefore, the performance of the pump is reduced by an increase of the gap due to wear, etc.

Further, for the plungers, corrosion and wear resistance is required also at sliding portions between the plungers and shaft seals which seal between fuel and oil. Wear of the sliding portions is not preferable because when fuel leaks into oil, the oil is diluted, and the lubrication performance and fuel consumption each are reduced.

The plungers and the cylinder block each are made of the following material.

The outer diameter and the cylinder bore slide in linear contact with each other at an initial stage, so that the contact portions have a high surface pressure (hertz stress). Therefore, the material is desirable to be hard in hardness. For the cylinder block, a martensite stainless steel of JIS (Japanese Industrial Standards) JIS SUS440C, JIS SUS420J2, which can be reduced to product shapes by press working, et. and has a high productivity, can be used by quenching and tempering. Further, alloy tool steel of SKD61, JIS SKD11 also can be used by quenching and tempering.

The material of JIS SUS440C, JIS SUS420J2 becomes a hardness of 500–700 Hv at a base material by quenching and tempering. Further, the material has a high corrosion resistance because of stainless steel.

Material for the plungers is the same as the material for the cylinder block. However, the material is exposed to a higher surface pressure than the cylinder block, so that the material is subjected to a surface treatment to obtain wear resistance by making the hardness higher.

Figure 5:
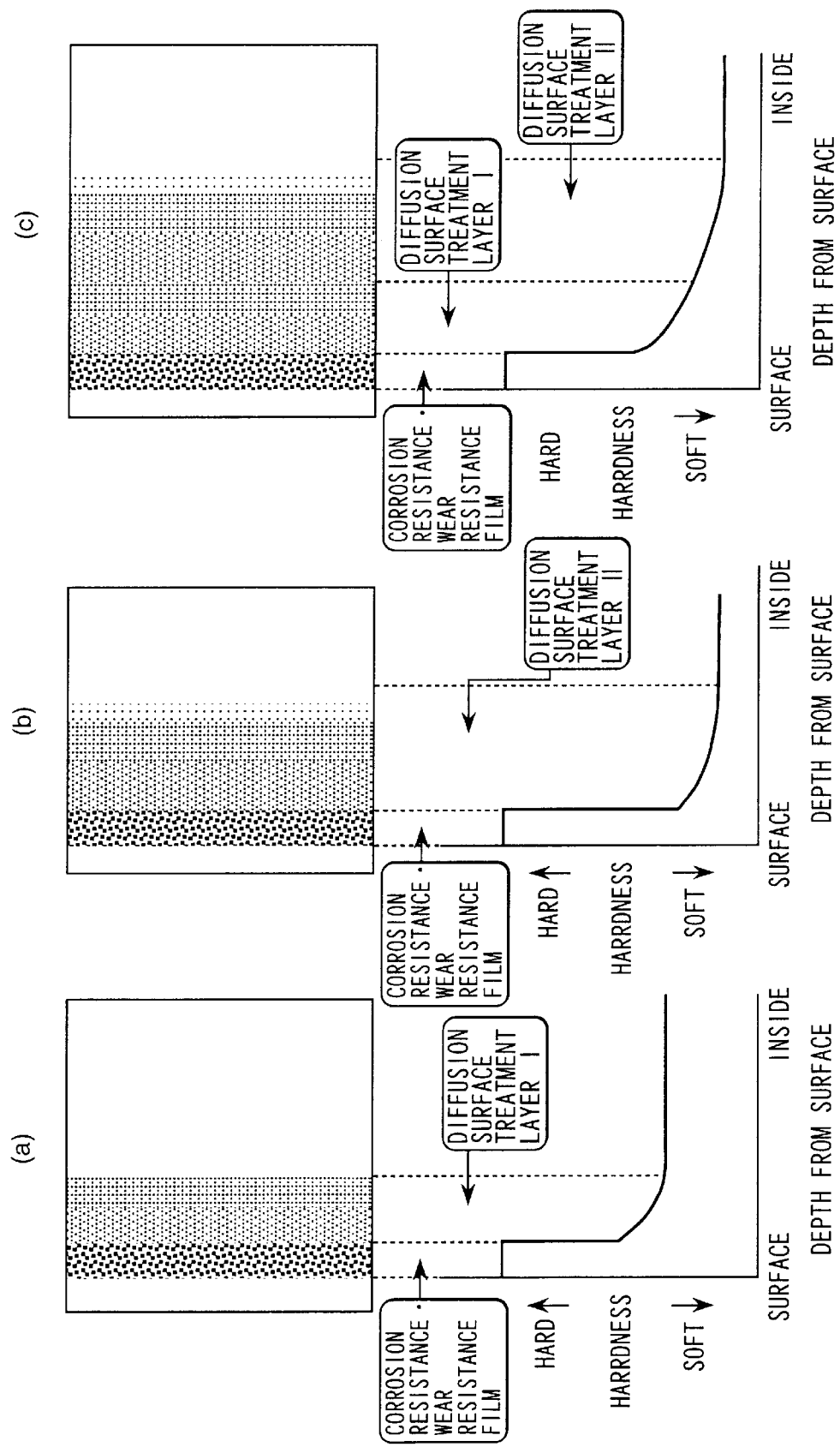
FIG. 5 is illustrations for explanation of structures of surface treatment layers in the present invention.

FIG. 5 shows surface structures according to the present invention. The surface structures each are made a compound surface treatment layer in which a diffusion surface treatment layer is formed in the base material and then a corrosion wear resistance film is formed on the surface. The surface structure shown in FIG. 5(a) is composed of a corrosion wear resistance film and a diffusion surface layer I, the surface structure in FIG. 5(b) is composed of a corrosion wear resistance hard film and a diffusion surface treatment layer II, and FIG. 5(c) is composed of a corrosion wear resistance hard film, a diffusion surface treatment layer I and a diffusion surface treatment layer II.

The diffusion surface treatment layer I is made of nitride, and as the layer there is a nitride layer, a carbonitrided layer, a soft nitride layer or a salt bath soft nitride layer, each of which mainly nitrogen are diffused in a low temperature treatment by which the properties of the base material are not lost, and fine nitride is precipitated to raise the hardness. A hard surface layer of hardness 1000 Hv or more can be easily formed, however, the treatment layer is relatively thin. Further, a property of being difficult to adhere is obtained and reactivity to friction wear is improved.

The diffusion surface treatment layer II is a carburized layer in which carbons are diffused in a high temperature region and a hardening heat treatment is effected to raise the hardness of the layer. The layer II becomes a layer hardened more deeply than the diffusion surface treatment layer I, and is excellent in load resistance when a high surface pressure is applied.

Those diffusion surface layers each has a property that it is difficult to exfoliate even when a high surface pressure is applied, because the treatment layer is continued from the base material. Further, a corrosion resistance wear resistance film is formed by raising the hardness of the base material, whereby load resistance to a high surface pressure is improved and exfoliation resistance of the hard film also is improved.

In order to satisfy the above-mentioned objective properties, a structure and surface state of the diffusion treatment layer I which becomes a ground for the corrosion resistance/wear resistance film becomes important. That is, it is essential that the nitride layer surface is the structure and state that the exfoliation resistance of the hard film is not damaged.

A plasma nitriding method is a method in which an article to be treated is arranged as a cathode in a pressure-reduced container (anode), nitrogen source gas ($N_2$) and dilution gas ($H_2$) are introduced therein, DC high voltage is applied thereto to cause DC discharge (grow discharge), and N ionized by DC plasma is diffused therein.

Figure 6:
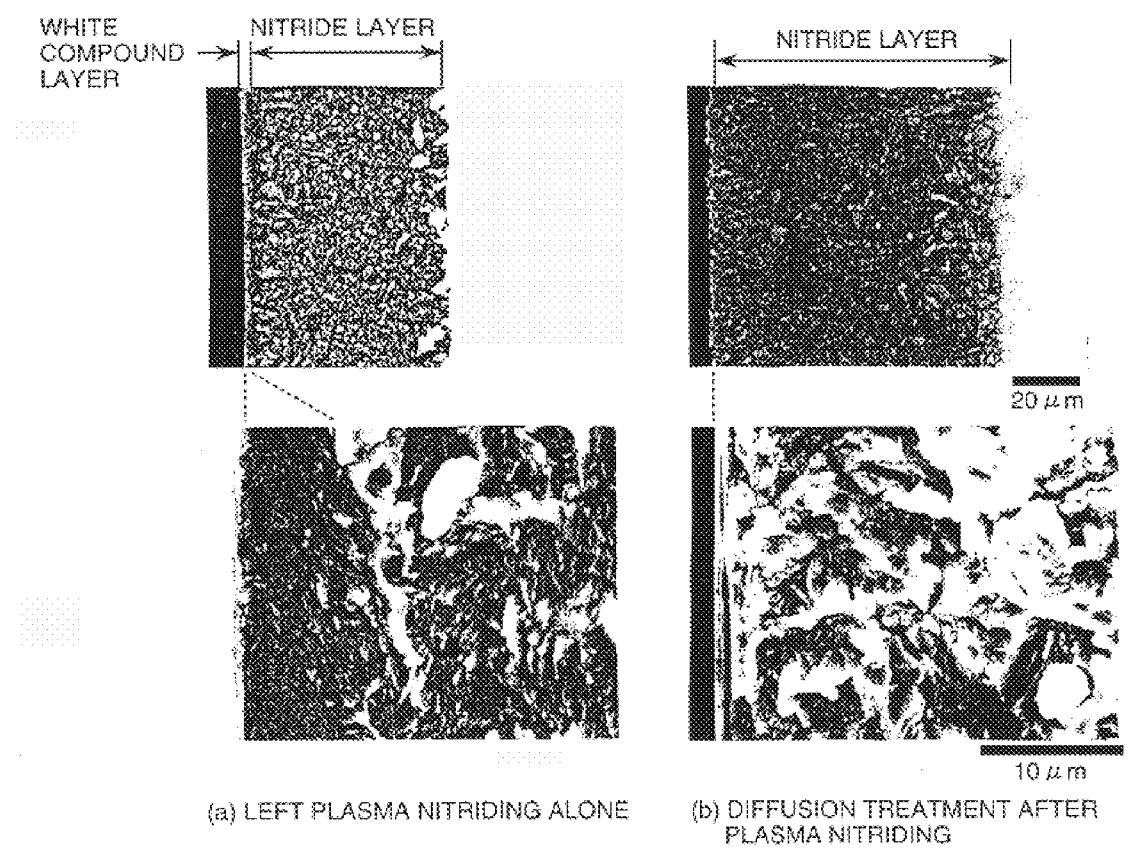
FIG. 6 is photographs showing optical and scan type electron microscopic structures of nitride layers used in the embodiment of the present invention.
Figure 7:
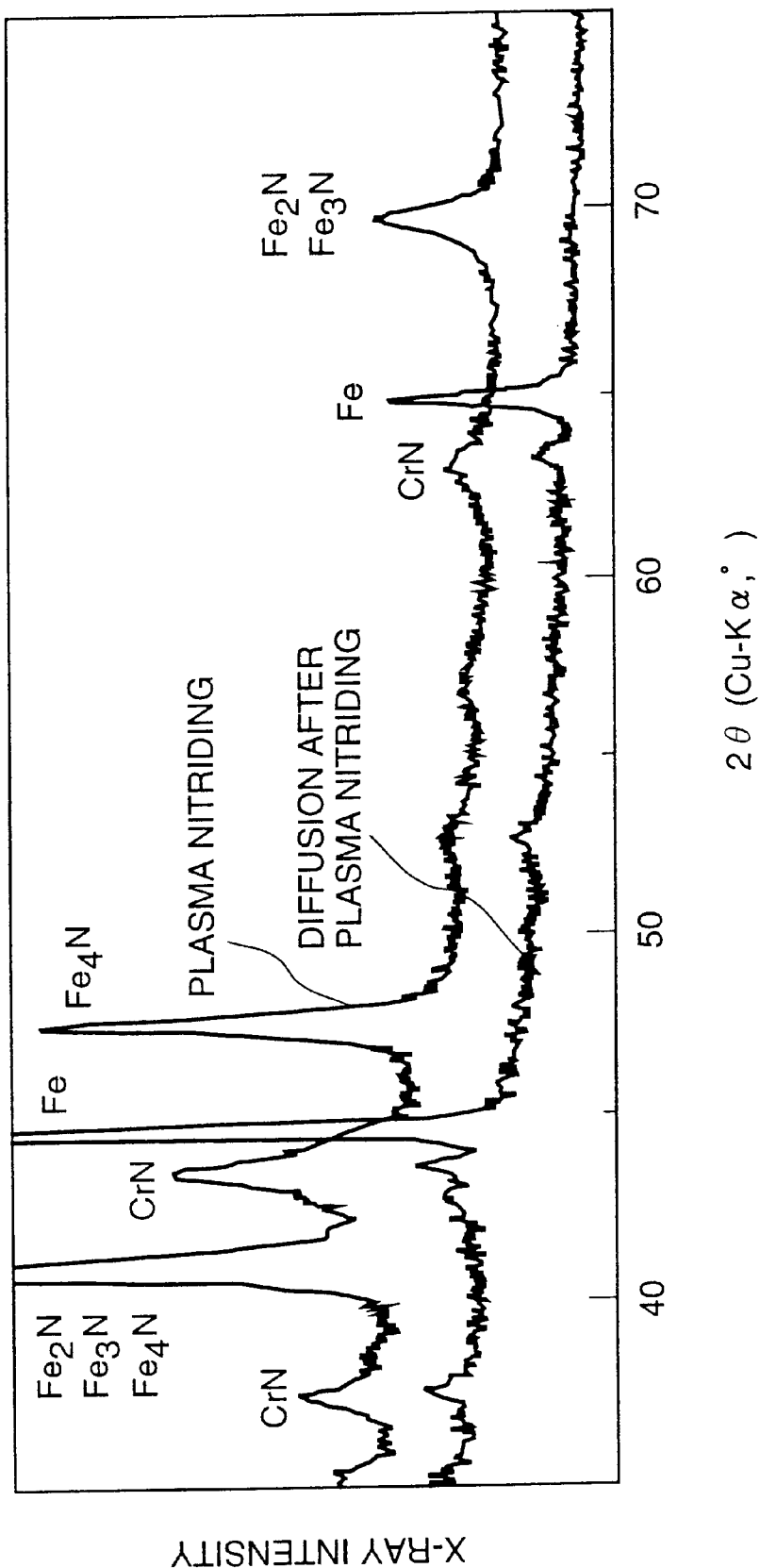
FIG. 7 is a graph showing results of X-ray analysis of nitride layers used in the embodiment of the present invention.

FIG. 6 and FIG. 7 show an example of analysis result of a surface layer formed by this nitriding method. A test piece is a martensite stainless steel of JIS SUS403. FIG. 6 shows an observation result of structure of sections of nitride layers by an optical microscope and a scan type electron microscope, and FIG. 7 shows an X-ray analysis result of surface layers. $Fe_2N$, $Fe_3N$ of an ε phase called white compounds of Fe-nitride, $Fe_4N$ of γ phase and CrN of Cr-nitride are formed on a most surface portion treated by the plasma nitriding. There is a layer appeared white on the most surface portion in the structure, and flat and smooth breakage occurs at a cleavage surface, and it is brittle and weak.

Figure 8:
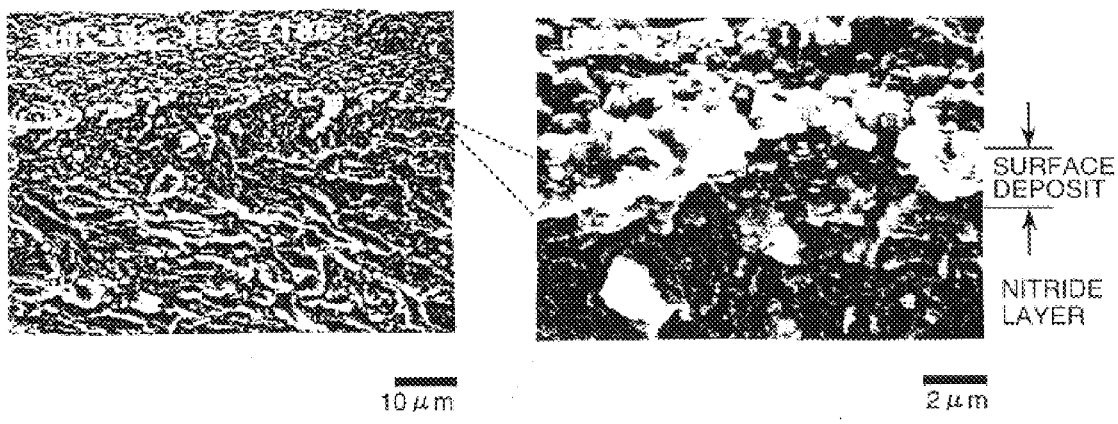
FIG. 8 is scan type electron microscopic pictures showing surface states treated by a conventional nitriding method.

FIG. 8 shows an observation result of surface states treated by plasma nitriding. It is noted that fine iron particles are adhered as a film of 1–2 μm or so on the most surface portion by adhesion phenomenon of sputter particles. When the fine particles exist on boundary of a hard film, adhesion force becomes weak and the exfoliation resistance is damaged.

For the above reasons, it is preferable to remove a most surface portion of about 10 μm by grinding or the like in the case where a nitride layer by plasma nitriding is used for the diffusion surface treatment layer I in the present invention.

Further, when the plasma nitriding is conducted, in order to remove a brittle and weak ε phase of white compound, it is preferable to conduct both of nitriding and diffusion treatment.

Figure 9:
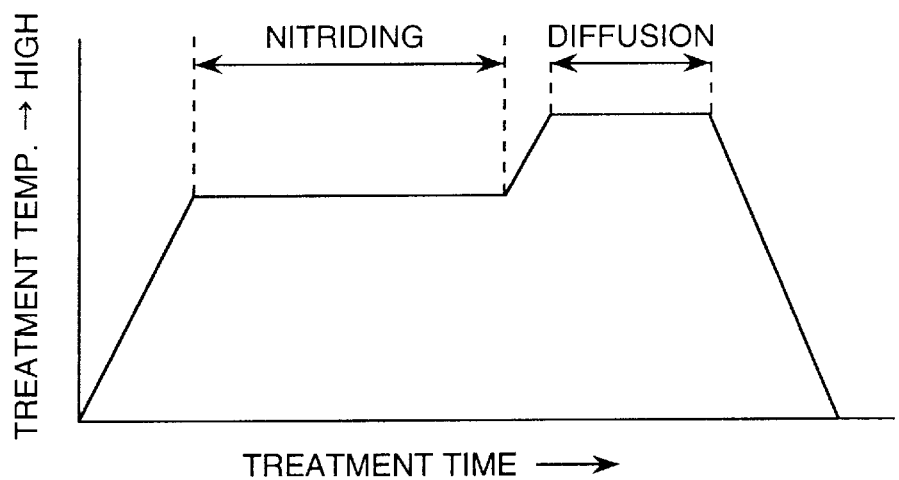
FIG. 9 is graphs each showing treatment processes used in an embodiment of the present invention.
Figure 9:
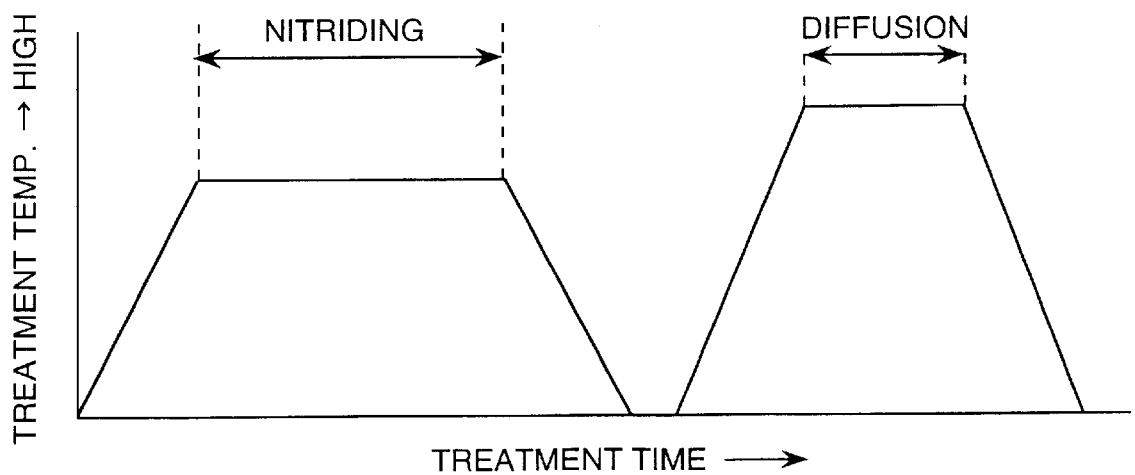

FIG. 9 is graphs each showing a treatment process of controlling the hardness of a nitride layer. In this case, as nitriding in the treatment process, it is possible to use a gas nitriding method or the like. However, a plasma nitriding (an ion nitriding method) which can more widely control compounds of a surface layer is more suitable.

In a treatment process (a), nitriding and diffusion are conducted continuously. In the present embodiment, the nitriding is conducted by the plasma nitriding. In the plasma nitriding, since the pressure-reduced container is cooled, temperature of articles to be treated can be heated and held at any temperature by input power (discharge power). Further, there is a feature that the atmosphere can be made into nitriding atmosphere or non-nitriding atmosphere (diffusion). On the other hand, in the gas nitriding method, it is difficult to conduct the process at a temperature region of about 600° C. or more because of its apparatus, so that there is a problem in a diffusion treatment at the temperature region of about 600° C. or higher.

In a treatment process (b), nitriding and diffusion are conducted discontinuously. In the present embodiment, the nitriding is conducted by plasma nitriding. In the diffusion process, heating and holding are effected in a vacuum heat treatment furnace. The process can be effected in a non-oxidizing atmosphere heat treatment furnace employing inert gas atmosphere such as $N_2$, Ar, etc., other than in the above-mentioned furnace.

Figure 10:
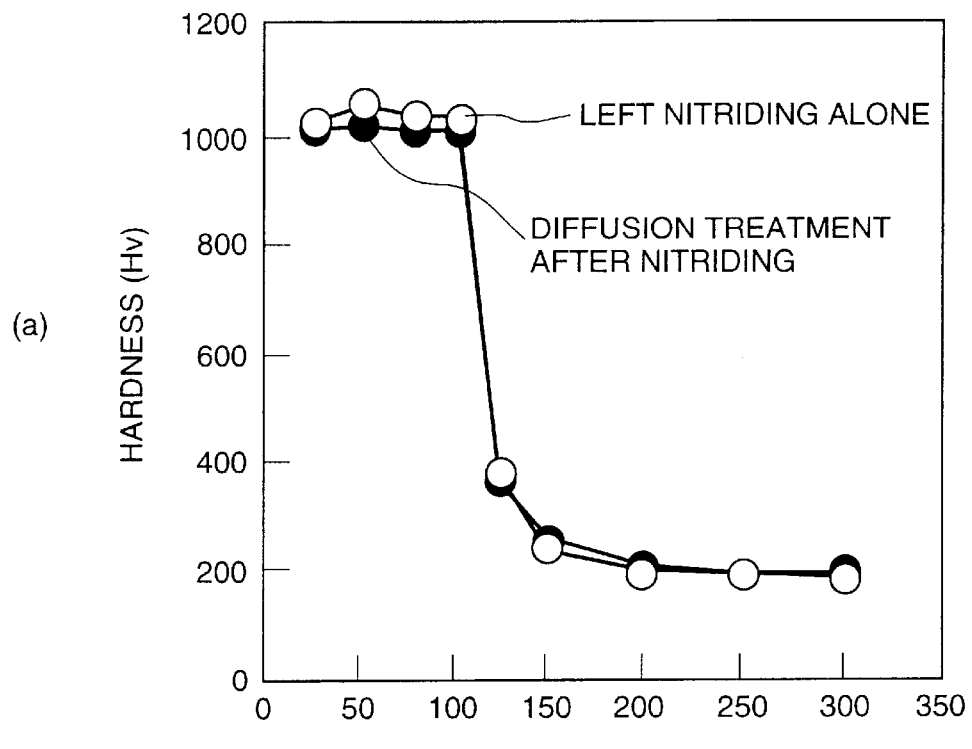
FIG. 10 is graphs each showing hardness distribution of nitride layers of various kinds of steels used in the embodiment of the present invention.
Figure 10:
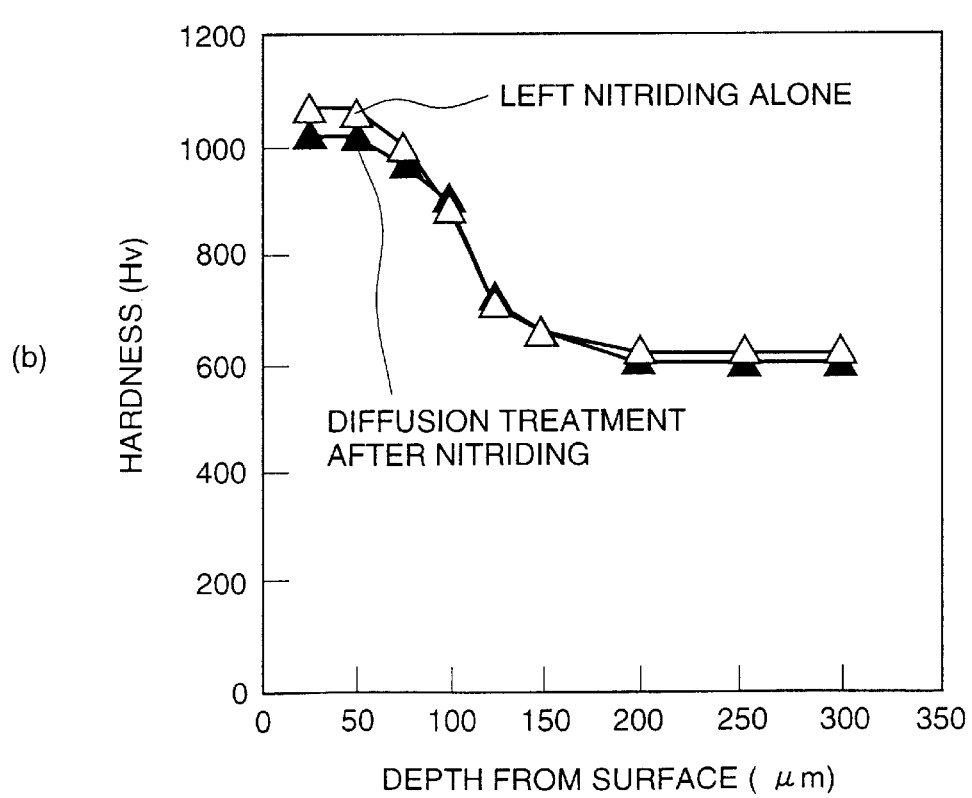

FIG. 10 is graphs (a) and (b) showing distributions of nitride layer hardness of the martensite stainless steel JIS SUS403 and the alloy tool steel JIS SKD11, respectively. Target values of the nitride layers are surface hardness 1000 Hv or more, hardened portion depth (case depth) 0.1 mm or more at hardness of 500 Hv or more.

The treatment conditions are as follows; temperature; 530° C., time; 8 hours, gas composition; $N_2/H_2=1/3$, pressure (Pirani); 40 Torr. In the distribution of hardness of the tool steel JIS SKD11 left nitriding alone (without any treatment after the nitriding), the hardness at a position of 25 $\mu$m from the surface is 1060 Hv and becomes gradually lower and reaches the hardness of the base material as it goes from the surface to inside.

The material having this hardness distribution is subjected to a diffusion process. In the plasma nitriding, temperature is 550° C., time is 2.5 hours, gas composition is only $H_2$, and pressure (Pirani) is 40 Torr.

In a distribution of hardness of the material subjected to a diffusion process after nitriding, the hardness at the surface is 1010 Hv, and it becomes gradually lower toward inside and reaches the hardness of the base material.

In the analysis results of surface layer in FIG. 6 and FIG. 7 as mentioned above, according to the nitriding treatment and diffusion process, any layer appeared white does not exist on the portion closest to the surface, and the cleavage surface does not become brittle breakage state, either. The compounds identified at the surface portion are CrN of Cr-nitride and α-Fe of the base material. It is found that by the diffusion treatment after nitriding, $Fe_2N$, $Fe_3N$ which is ε phase of a white compound disappear and do not exist. Results about other kinds of steels were the same as the above-mentioned results.

As is apparent from this result, the hardness is controlled and a tough nitride layer is formed by nitriding and diffusion treatment. Further, compounds of the surface layer also can be controlled. Therefore, the surface of a brittle e phase is unnecessary to be ground off. However, in this case, also, fine iron particles are adhered about 1–2 $\mu$m as a film by adhering phenomenon of sputtering particles due to ion, so that they are necessary to be removed by lapping or the like.

Figure 11:
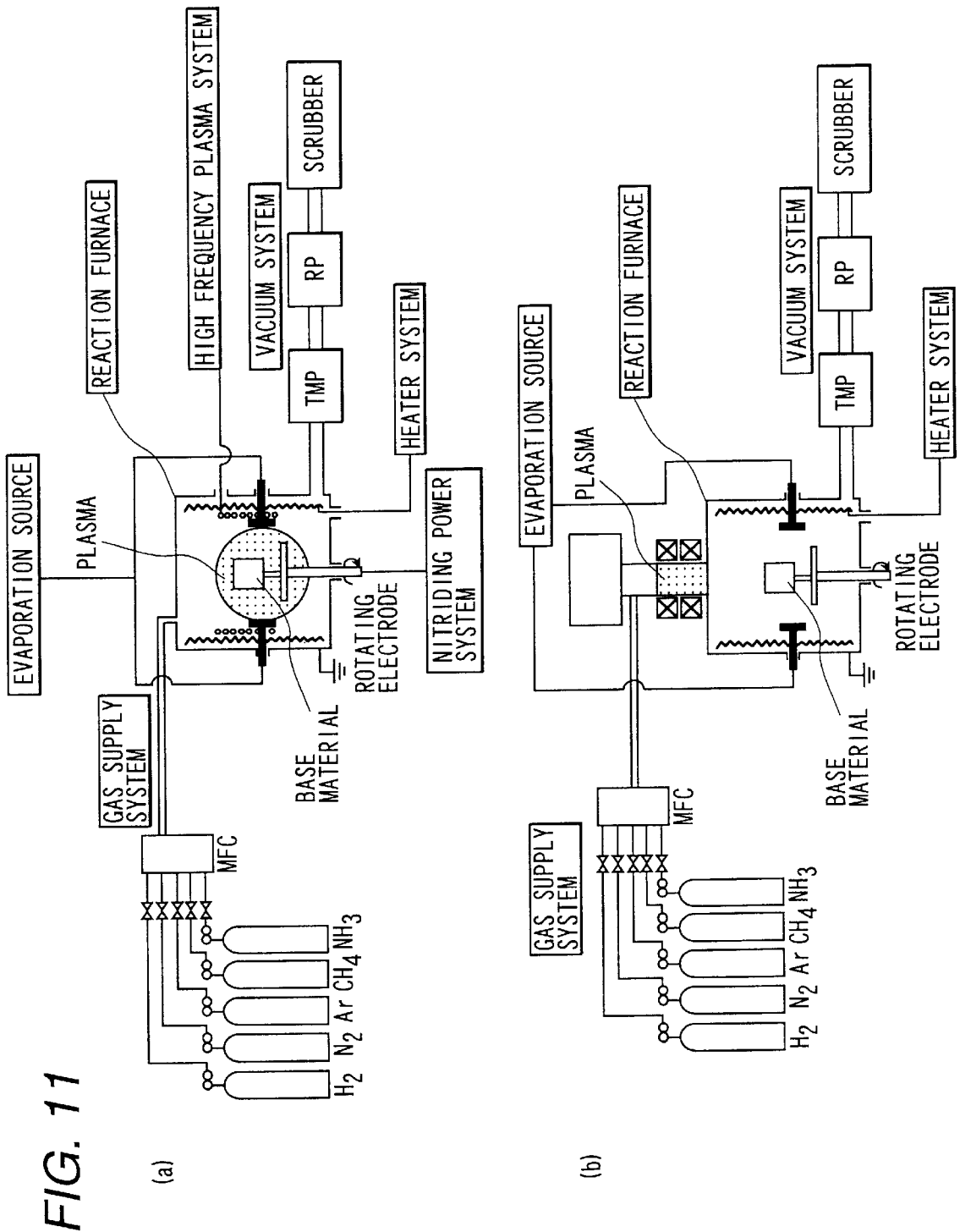
FIG. 11 is explanation view of treatment apparatus used in the embodiment of the present invention.

Therefore, in order to form a surface compound layer or a nitride layer that sputter particles do not adhere, a surface treatment apparatus according to the present invention as shown in FIG. 11 is used. The surface treatment apparatus of FIG. 11 forms a diffusion surface treatment layer on a base material and then forms continuously corrosion resistance wear resistance hard film. Therefore, a mechanism of a diffusion surface treatment system and a corrosion resistance wear resistance hard film system is provided. FIG. 11(a) and (b) are different form each other in a plasma source for activating process gas in the diffusion surface treatment system, and a high frequency plasma system is shown in FIG. 11(a) and a microwave plasma system is shown in FIG. 11(b).

Nitride layer formation of diffusion surface treatment by using the surface treatment apparatus is performed by introducing hydrogen, nitrogen, hydrogen and ammonia, or dilution gas other than the above as a processing gas into a vacuum furnace and generating plasma to activate the process gas. In such a case, a processed product is heated and held by a heater in the furnace, so that it is unnecessary to apply ion shock in the plasma nitriding. Therefore, it is different from plasma nitriding and does not need sputter due to ion shock, so that the surface layer without adhesion of sputter particles is formed. Further, in the surface compound layer, it is possible to suppress formation of white compound by controlling composition ratios of composition of the processing gas.

By the surface treatment apparatus in the present invention, diffusion surface treatment (formation of a nitride layer) of various kinds of steels was performed. As a result, the structures and surface states shown in FIGS. 6 and 7 were obtained. Thereby, an optimum diffusion surface treatment layer for forming a corrosion resistance and wear resistance hard film was provided.

A nitride layer combines with a nitride forming element added to a base material to be in solid solution in the base material, for example Cr and forms nitride CrN. Therefore, in high Cr steels such as stainless steels, the property of excellent corrosion resistance given by addition of Cr is a little detracted because Cr of the base material forms nitride to decrease the Cr concentration, therefore, the stainless steel becomes steel other than stainless steel. Thereby, the corrosion resistance a little decreases.

FIG, 12 shows corrosion resistance of various kinds of material. It is expressed by natural potential and pitting potential in solutions of water, ethyl alcohol 13.5 vol. %, and acid ion concentration of total acid value 0.13 mg KOH/g. The larger the national potential and pitting potential each are, the more excellent the corrosion resistance is. In each stainless steel, both the natural potential and pitting potential are in a high region, which shows excellent corrosion resistance. On the contrary, alloy tool steel JIS SKD11 and its nitriding material each are in a low region of natural potential and pitting potential. A nitrided material of stainless steel JIS SUS403 also is in a low region, and it is found that the corrosion resistance is a little decreased by nitriding.

In the fuel pump according to the present invention, it is supposed that the fuel that methyl alcohol and ethyl alcohol are added to gasoline, detracted gasoline, or the like is used therefor. In such gasoline, it is necessary to consider an effect of oxidation of material due to mixing with water, acid components, or the like. That is, when contact portions of a slide mechanism part are in oxidation atmosphere, there is the possibility that a phenomenon of wear and tear occurs. In such a case, the atmosphere becomes severe to wear and tear, and it is considered that a quantity of wear of the slide portions increases.

Figure 13:
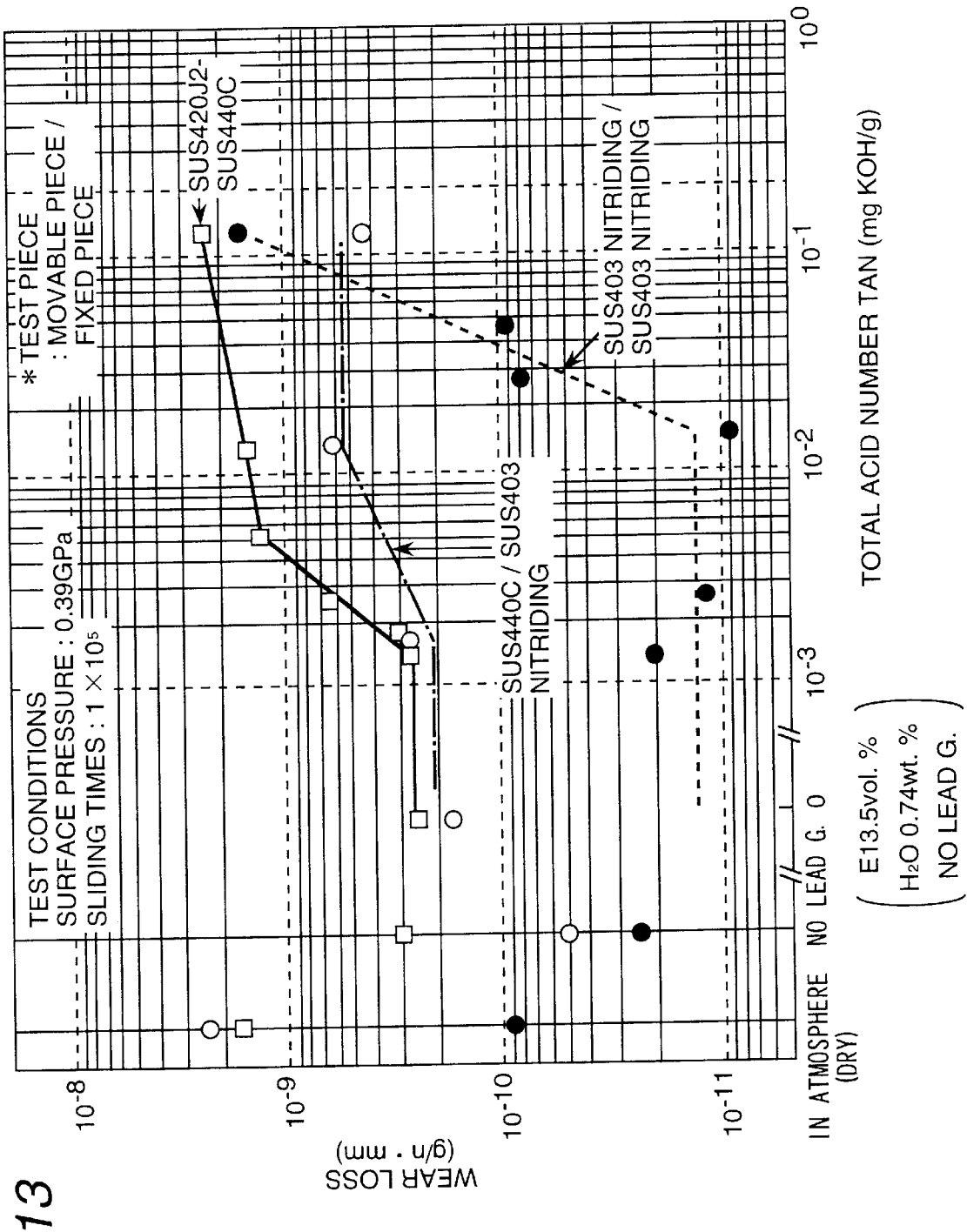
FIG. 13 is an explanation diagram for explaining oxidation wear in combination of various steels.

FIG. 13 shows the concentration of acid ions in gasoline, affecting a quantity of wear. In reciprocation slide wear test, wear loses of a fixed piece are shown when acid ion concentrations are variously changed in gasoline containing ethyl alcohol 13.5 vol. % and water 0.74 wt %. From FIG. 13, a quantity of wear of nitrided materials is less than a combination of stainless steels and corrosion resistance is better. However, in any material combinations, as total acid value (acid ion concentration) increases, the worn quantity tends to increase when beyond a certain value. Therefore, it is found that corrosion wear is occurring in a concentration region in which the worn quantity increases.

By this result, there is no problem in the circumstances in which gasoline of good quality is used, however, it is essential to take care of materials in the case where such fuel that seems to be corrosive is used.

Here, in the present invention, as shown in FIG. 5, a corrosion resistant and wear resistant hard film is formed on the most surface portion. As the corrosion resistant and wear resistant hard film, TiC, WC and SiC as carbide, TiN, CrN, BN, TiAlN as nitride, $Al_2O_3$ as oxide are selected according to an object and the hard film is formed by the PVD in which a dense film can be formed in a low temperature region by high adhesion.

FIG. 11 is block diagrams each showing a process apparatus for forming corrosion resistant wear resistant hard films. In FIG. 11, an arc-ion plating of ion plating methods is shown, however, any other type, for example, hollow cathode type, or arc discharge type or sputtering type can be used.

The arc-ion plating generates vacuum arc discharge between a cathode composed of material evaporating and forming a film and an anode under current of several tens to several hundreds A and voltage of 15–30V in a vacuum furnace of low gas pressure atmosphere of several tens Pa or less. The vacuum arc is characterized in that an arc spot on which discharge current concentrates occurs on an evaporation surface of the cathode. The diameter of the arc spot is called about 10 $\mu$m or so, and large current concentrates on the very small region to generate a high temperature of $4 \times 10^3$–$10^{4\circ}$ C. and instantaneously evaporate the cathode. The arc spot moves randomly at a high speed on an evaporation surface of the cathode, so that irrespective of the spot being at a very high temperature, the cathode material (target) which is cooled is kept solid. Therefore, when the vacuum arc discharge is used, it is possible to generate vapor from a solid target as vaporization due to sublimation.

In the apparatus of FIG. 11, a vacuum arc evaporation source evaporating a target by vacuum arc discharge and a substrate coated with ionized vapor generated from an arc spot are set in the vacuum furnace. Negative bias voltage is applied on the substrate, whereby ions reaching the substrate are accelerated to be suitable energy and characteristics of a film formed thereby are controlled. In the vacuum furnace, a supply line for gas is provided, for example, $N_2$ gas is introduced while evaporating Ti, whereby it is possible to perform reactive coating for forming a TiN film.

Any material basically can be used as a target material of evaporation material as long as it is solid material having electric conductivity, for example, metal material, conductive ceramics, graphite, etc. can be used.

Figure 12:
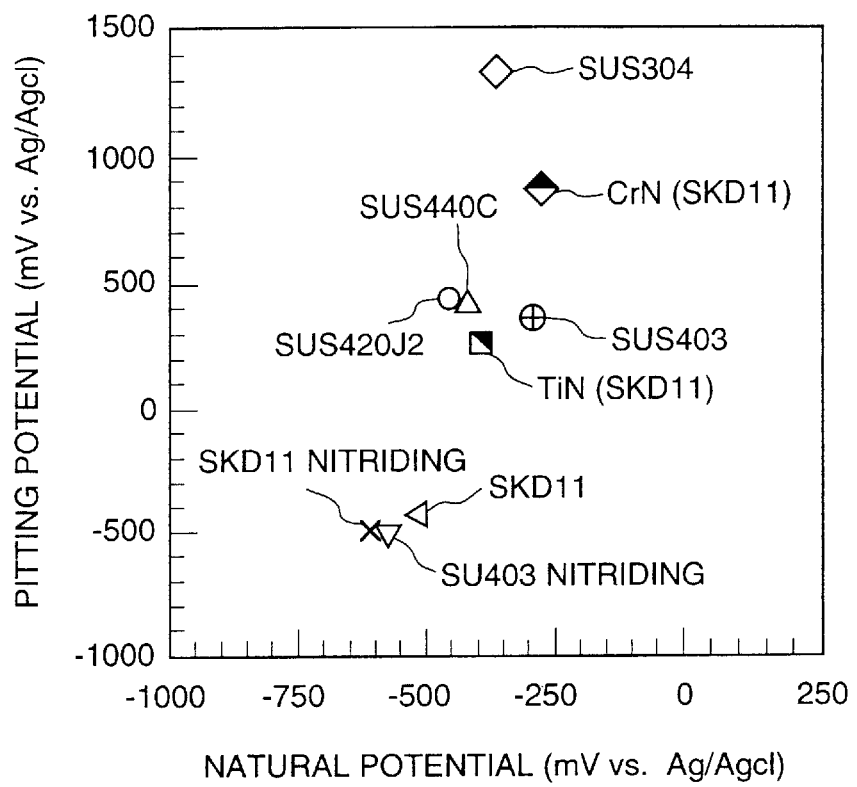
FIG. 12 is a graph showing corrosion resistance of various steels used in the present invention.

Corrosion resistant and wear resistant hard films formed by such an apparatus are excellent in corrosion resistance because of dense and non-metallic properties of matter. For example, observing corrosion resistance in FIG. 12, CrN (base material is JIS SKD11) is in a region in which natural potential and pitting potential are higher than various kinds of steels other than JIS SUS304, and excellent in corrosion resistance. Further, it is noted that it is remarkably improved in corrosion resistance as compared with the base material JIS SKD11.

The corrosion resistant and wear resistant hard film has an effect that suppresses a metal transfer phenomenon occurring between the film and a contacting material therewith and does not cause adhesion and seizure, and it has a small friction resistance, so that initial wear, steady wear, seizure, etc. are prevented. Therefore, it has a small value as compared with wear loss of various kinds of materials in FIG. 13. Further, an effect of it on corrosion and wear was small. Thereby, it can be worked as slide members in gasoline which is severe to corrosion circumferences.

Figure 14:
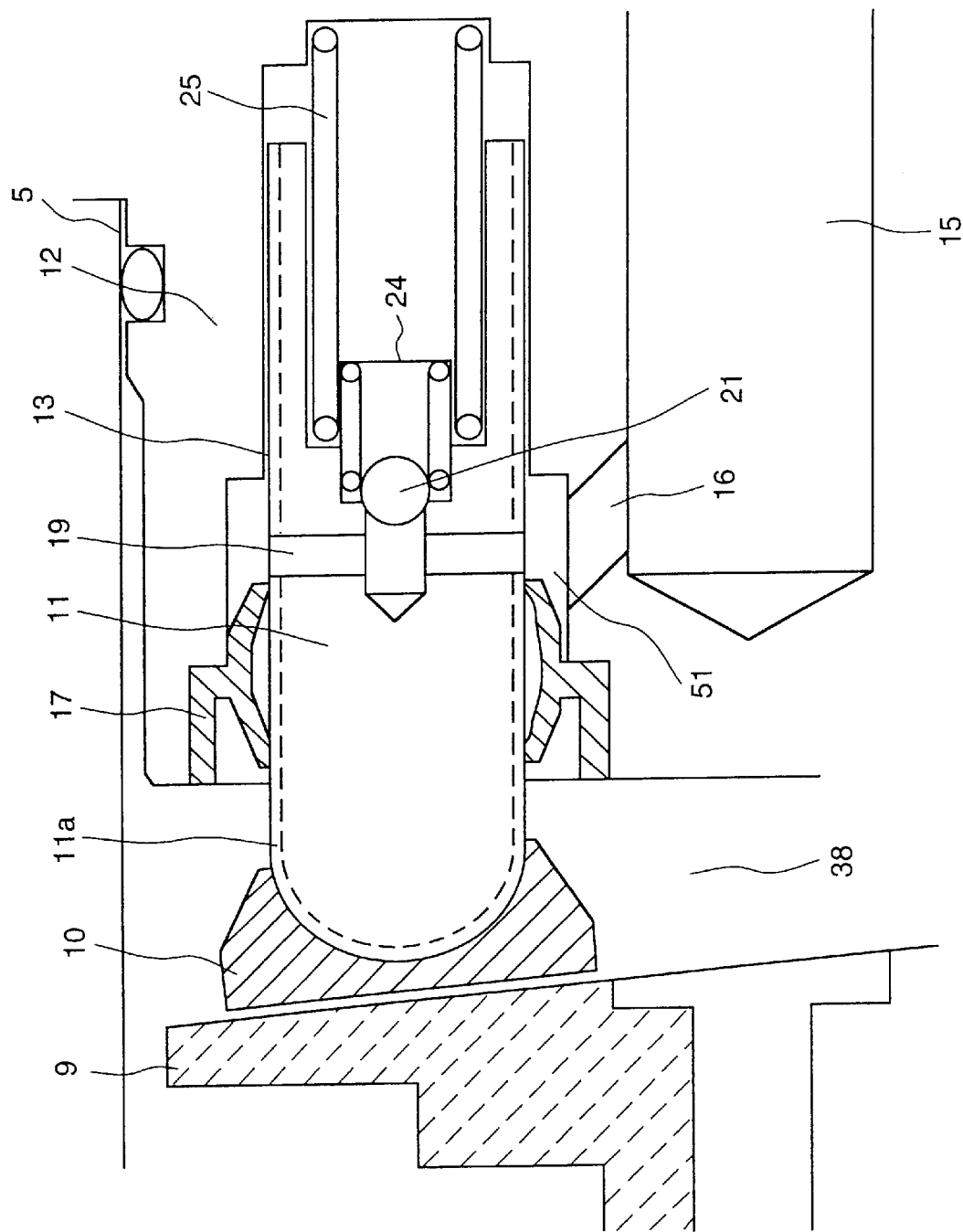
FIG. 14 is an enlarged sectional view of part of the plunger in FIG. 1, showing a surface treatment layer in the first embodiment.

FIG. 14 shows details of part of the embodiment 1. Gasoline flows in the pump chamber through the intake space 15 and the communication passage A 16 and the counterbore 51 each formed in the cylinder block 12, and further through the introduction hole 19 and the intake valve 24, in the above-mentioned order, and the gasoline is pressurized. In this case, fuel and oil are separated by the seal 17 provided in the plunger 12 during reciprocation of the plunger 11. As countermeasures of wear of the plunger 11 sliding on the seal 17 (of elasticity, for example rubber) and wear of the plunger 11 sliding in the cylinder bore 13, a surface treatment layer 11a composed of a diffusion surface treatment layer and a corrosion resistant and wear resistant hard film are formed.

In the present embodiment, the surface treatment surface 11a of the plunger 11 has a corrosion resistant and wear resistant hard film and a diffusion surface treatment I formed, as shown in FIG. 5(a). The base material is alloy tool steel JIS SKD11, and the diffusion surface treatment layer I is formed in a nitride layer of 50 $\mu$m as shown in FIG. 10(b). CrN of 4 $\mu$m is formed on the surface by the treatment apparatus of FIG. 11.

On the other hand, the swash plate 9 and the slippers 10 slide at a high peripheral speed in oil inside the swash chamber 38 formed between the body 5 and the cylinder block 12. A combination of materials also is important.

As material of the swash plate, a surface treatment material of alloy steels for machine structural use, cast iron, and its surface treatment material can be used. As the surface treatment of alloy steels of machine structural use, chromium molybdenum steel SCM415 carburized and quenched can be used. As the cast iron, gray cast iron, nodular graphite cast iron, or those cast irons in each of which the base material is strengthened by quenching or austempering, or surface treatment is performed can be used. As the surface treatment, it is performed for a nitride layer, carbonitrided layer, soft nitride layer, salt bath soft nitride layer, carburized and quenched layer or their laminated treatment layer.

As material of the slippers, aluminum alloy, copper alloy, sintered alloy, alloy tool steel, stainless steel and its surface treatment material can be used. Of aluminum alloys, there is a high Si alloy A 390, etc. As the copper alloys and sintered alloys, various kinds of materials of wear resistance can be used.

In the alloy tool steels JIS SKD61 and JIS SKD11, the hardness of its base material can be raised by quenching and tempering. Therefore, the material has sufficient strength, durability and wear resistance. Further, since the alloy cool steels each have 5–13% or so of Cr, etc. of nitride forming element added thereto, the hardness of a nitride layer becomes 1000 Hv or more by general nitriding, and a hard surface layer can be formed and supplied by nitriding. In distribution of the hardness, the hardness is high at surface and gradually decreases toward an inner side. However, in a JIS SKD11 material, the hardness of base material decreases slightly by heat history of nitriding as compared with quenching and tempering.

In stainless steel, for example JIS SUS403 is used. JIS SUS403 material is excellent in reducibility, and able to be plastically reduced in a low temperature region and formed in product shapes by press machine or the like because the hardness of heat-treated base material is 190 Hv, and soft. Therefore, it is excellent in productivity. However, since an amount of carbon thereof is small, the hardness is about 300 Hv and soft even if quenching and tempering are effected. Therefore, in order to obtain wear resistance, a surface treatment is applied. For example, JIS SUS403 material has 13 % of Cr added to of nitride forming element to its alloy composition, so that the hardness of a nitride layer thereof becomes 1000 Hv or more by nitriding.

Figure 15:
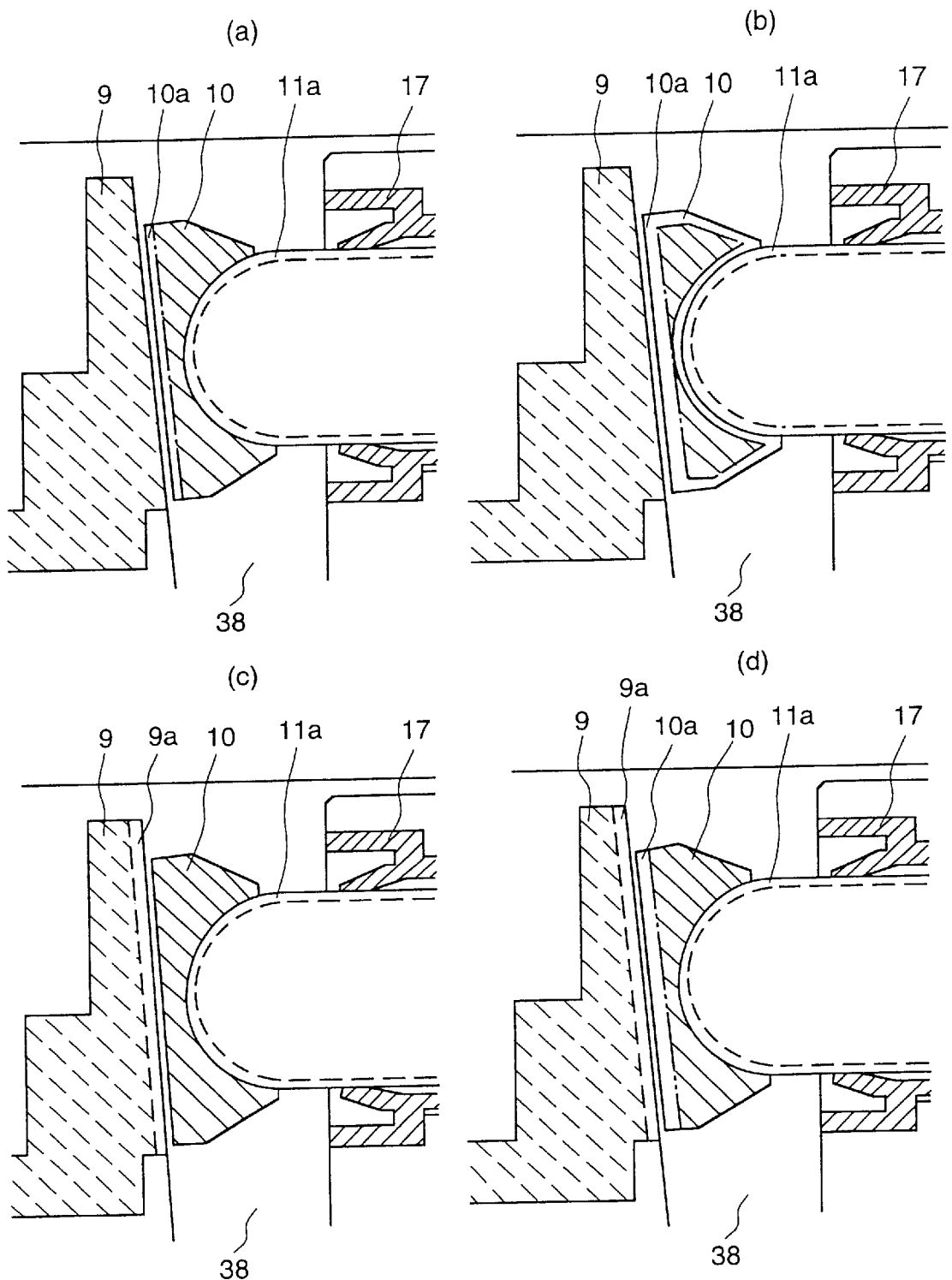
FIG. 15 is enlarged sectional views showing surface treatment layers of the swash plate and slipper in FIG. 1 in the first embodiment.

FIG. 15 shows sections of slipper 10 in which surface treatment is applied. Material and specification are as follows.

In FIG. 15(a), a surface treatment layer 10a of the slipper is formed only in a slide side at which the swinging swash plate 9 slides. In FIG. 15(b), the surface treatment layer 10a of the slipper 10 is formed on a front surface, and it is formed also on a portion sliding relative to the plunger 11. In FIG. 15(c), a surface treatment layer 9a of the swash plate 9 is formed. In FIG. 15(d), surface treatment layers 9a, 10a are formed on the swash plate 9 and the slipper 10, respectively.

As the surface treatment layers 9a, 10a, a treatment structure as shown in FIG. 5 also can be applied. Further, a nitride layer, carbonitrided layer, soft nitride layer, salt bath soft nitride layer, carburized and quenched layer or a treatment of lamination of them also can be used as other than in FIG. 5.

For example, in order to make the surface hardness of the swash plate 9 higher than the slipper 10, a nitride layer 9a of swash plate is formed by plasma nitriding of JIS SUS403, The treatment conditions are as follows: temperature; 530° C., time; 7 hours, gas composition; $N_2/H_2=1/3$, pressure (Pirani); 40 Torr. The hardness of the nitride layer is 900 Hv or more and case depth is 0.1 mm (500 Hv or more). After the nitriding, barrel grinding is performed to remove fine particles of the most surface portion and improve surface smoothness. Further, in such a case, the hardness of the nitride layer 10a of slipper can be the same as that of swing plate nitride layer 9a.

Durability test of a swash plate type axial plunger pump to be practiced, constructed as in the above, shown in FIG. 1 was conducted.

As a result, the pump worked without abnormality, stable values of gasoline delivery flow performance were obtained. After the test, the pump was disassembled, and each part inside the fuel chamber was examined, as a result, abnormal wear did not occur in any of the parts and the parts were in steady wear state.

On the other hand, without any treatment, a little wear occurred in slide portions between the outer diameter portion of the plunger 11 and the seal 17.

In the fuel pump constructed according to the present invention, slide parts are difficult to adhere each other, and the wear resistance is improved. Since a surface treatment layer composed of a corrosion resistant and wear resistant film and a diffusion surface treatment layer is formed even under high surface pressure, it is difficult to be separated and has a property excellent in corrosion resistance. The wear resistance under severe circumstances is improved by those properties and a fuel pump of the object can be provided.

Embodiment 2

The present embodiment relates to a radial plunger fuel pump (one cylinder type).

The radial plunger fuel pump has a shaft transmitting driving force of an engine, a driving cam converting rotation of the shaft into swing motion, a plunger reciprocated by the rotation of the driving cam through a lifter and a cylinder bore taking in and delivering fuel in combination with the plunger, wherein a diffusion surface treatment layer and a corrosion resistant and wear resistant hard film are formed on a surface of one of members of the mechanism part lubricated with fuel and sliding and a pump part.

Figure 16:
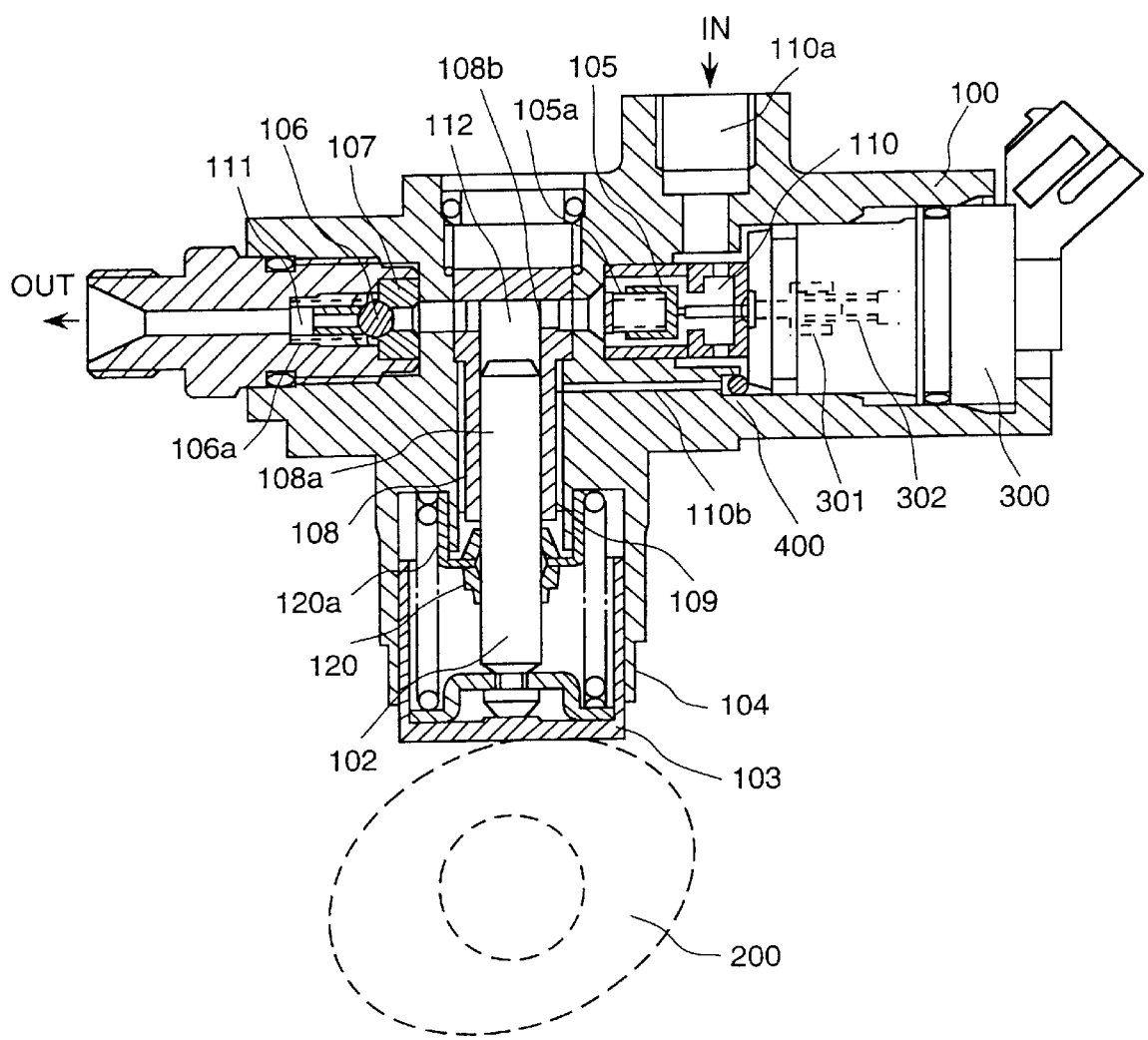
FIG. 16 is a sectional view of a fuel pump of a second embodiment of the present invention.
Figure 17:
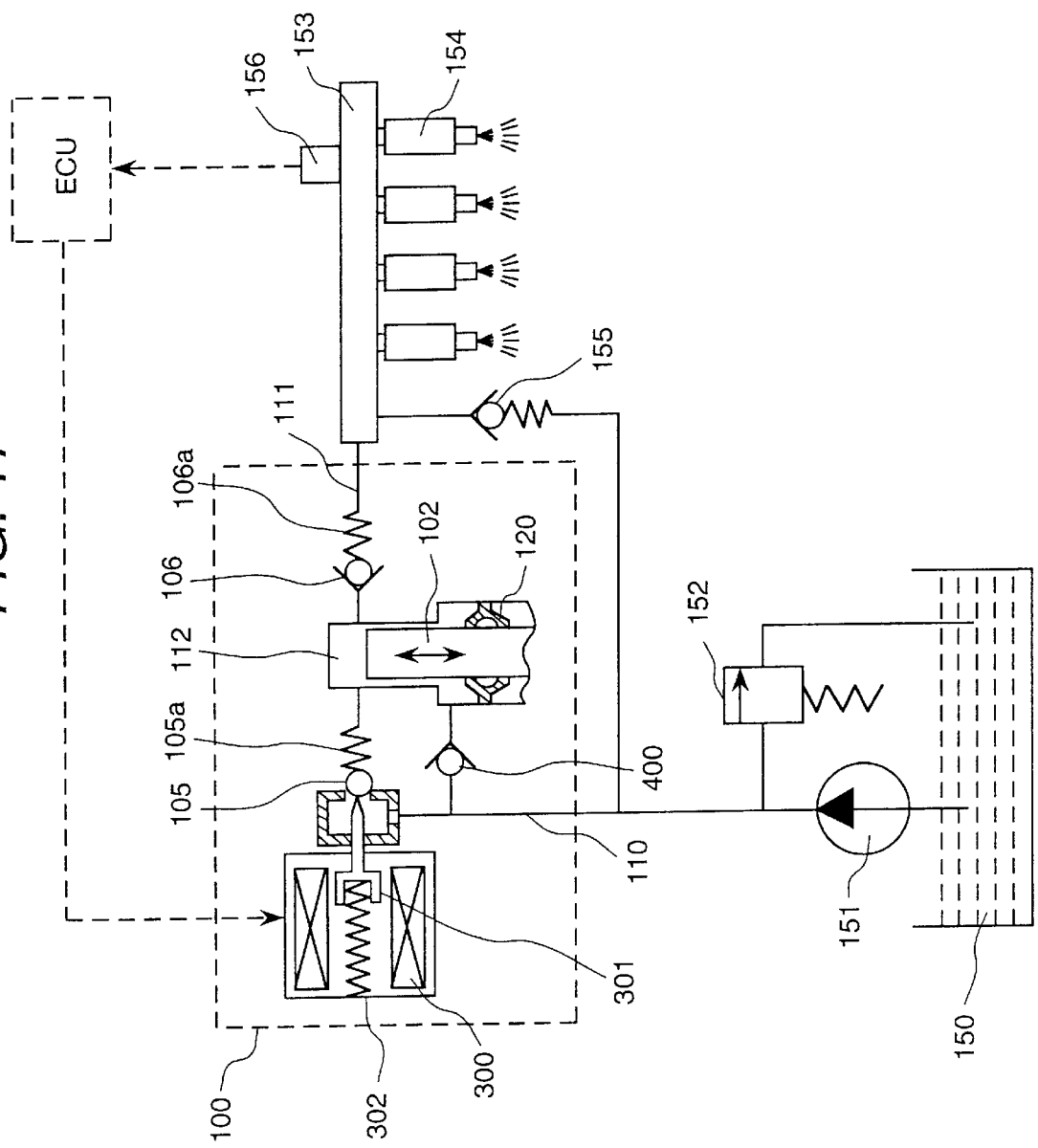
FIG. 17 is a schematic diagram showing a fuel injection system construction in the first embodiment.

FIG. 16 and FIG. 17 show details of the radial plunger fuel pump of the invention. FIG. 16 is a vertical section of the fuel pump and FIG. 17 is shows a fuel injection system using the present embodiment.

A pump body 100 is provided with an intake passage 110, a delivery passage 111 and a pressurizing chamber 112. An intake valve 105 and a delivery valve 106 are provided on the intake passage 110 and the delivery passage 111 and urged by a spring 105a and a spring 106a to be held by one side, respectively, thereby to form check valves to restrict flow directions of fuel.

Here, in the pressurizing chamber, the plunger 102 which is a pressurizing member is slidably held. A lifter 103 provided at a lower end of the plunger 102 is pressed on a cam 200 by a spring 104. The plunger 102 is reciprocated by the cam 200 rotated by an engine cam shaft or the like to change a displacement of a pressurizing chamber 112. When the intake valve 105 is closed during compression stroke of the plunger 102, the pressure in the pressurizing chamber 112 rises, whereby the delivery valve 106 is automatically opened and fuel is pressurized and delivered to a common rail. The intake valve 105 is automatically opened when the pressure in the pressurizing chamber 112 becomes lower than that at a fuel introduction port, however, closure of the valve is determined by an operation of a solenoid 300.

In the pump body 100, the solenoid 300 is mounted. The solenoid 300 has an engage member 301 and a spring 302 arranged therein. The engage member 301 is urged by the spring 302 so as to open the intake valve 105 when the solenoid 300 is off. The urging force of the spring 302 is made larger than the urging force of the intake valve spring 105a, so that when the solenoid 300 is off, the intake valve 105 is in an open state as shown in FIG. 16.

Current passage to the solenoid 300 is controlled so that when high pressure fuel is supplied from the pump body 100, the solenoid 300 is turned on (current passage), and when the fuel supply is stopped, the solenoid 300 is turned off.

When the solenoid 300 is held on (current passage), electromagnetic force larger than the urging force of the spring 302 is generated to attract the engage member 301 toward the solenoid 300, so that the engage member 301 and the intake valve 105 are separated. Under the condition, the intake valve 105 becomes an automatic valve that opens and closes in synchronism with reciprocation of the plunger 102. Therefore, during compression stroke, the intake valve 105 is closed, fuel by decrement of the displacement of the pressurizing chamber 112 is delivered to the common rail by pressing the delivery valve to open.

On the other hand, when the solenoid 300 is held off (nor current passage), the engage member 301 engages with the intake valve 105 by the urging force of the spring 302 to hold the intake valve 105 open. Therefore, the pressure in the pressurizing chamber 112 is held at a lower value which is substantially the same as that at the fuel introduction port even during compression stroke, so that the delivery valve can not be opened and fuel corresponding to a decrement of the displacement of the pressurized chamber 112 is returned toward the fuel introduction port through the intake valve 105.

Further, When the solenoid 300 is made into a on-state midway through compression stroke, fuel is delivered to the common rail 153 from that time. Further, once the fuel delivery starts, the pressure in the pressurizing chamber 112 rises, so that after that even if the solenoid 300 is made off, the intake valve 105 is kept closed and automatically opened in synchronism with commencement of intake stroke.

Next, a construction of a fuel supply system employing the present embodiment will be explained, referring to FIG. 17.

Fuel in a tank 150 is introduced into the fuel introduction port of the pump body by a low pressure pump 151, with the pressure of the fuel being adjusted to a constant pressure by a pressure regulator 152. Then, the fuel is pressurized by the pump body 100 and forcibly delivered from the fuel delivery port to the common rail 153. On the common rail 153, injectors 154, a relief valve 155 and a pressure sensor are mounted. The number of injectors 154 corresponds to the number of the cylinders, and the injectors each inject fuel in response to a signal from the an engine control unit (ECU). Further, the relief valve 155 opens when the pressure inside the common rail 153 exceeds a prescribed value and prevents breakage of piping.

Figure 18:
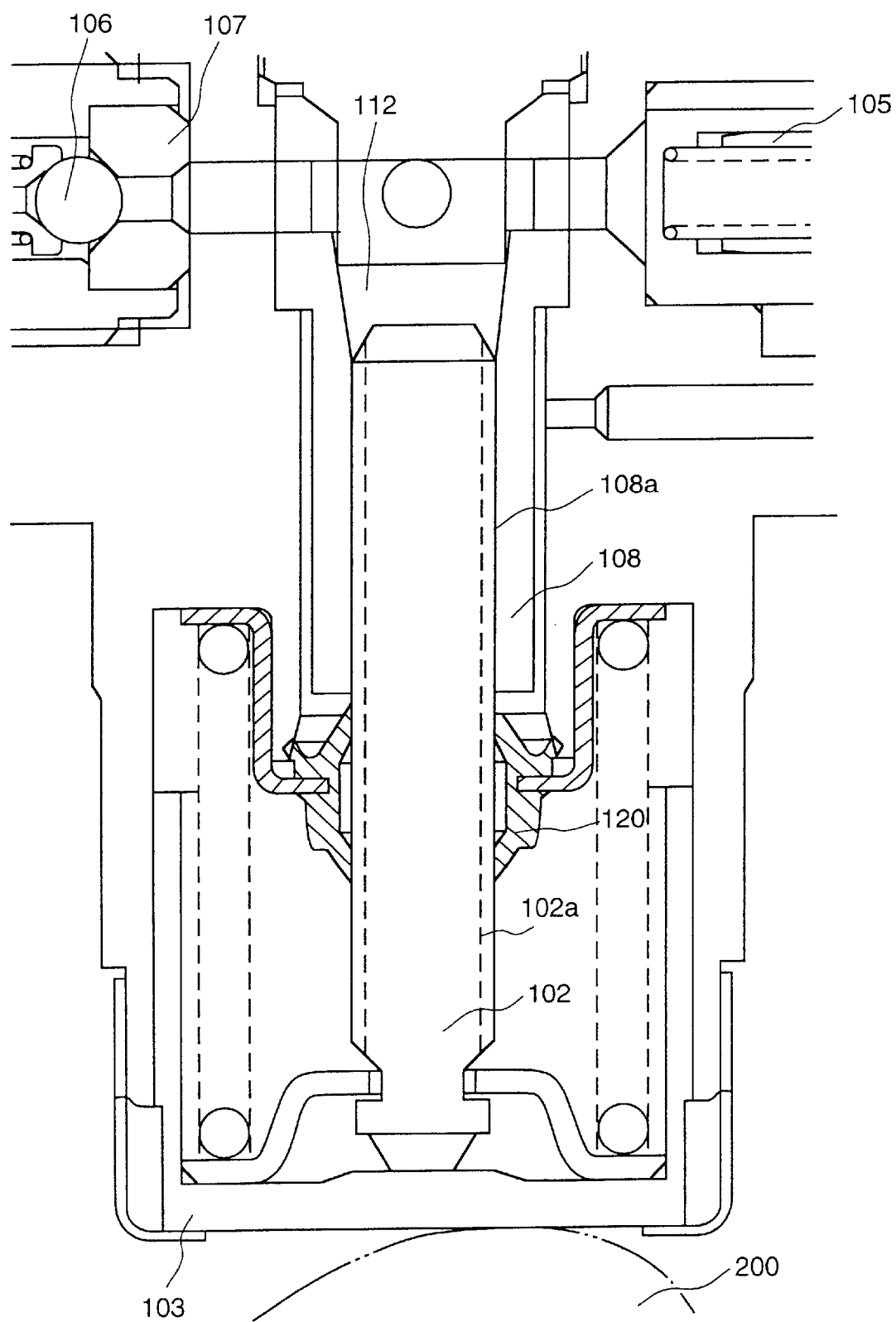
FIG. 18 is an enlarged sectional view of a surface treatment layer of the plunger in FIG. 16 in the second embodiment.

Here, the surface structure of the plunger 102 is formed as shown in FIG. 5. FIG. 18 shows details of part of the embodiment 2. Gasoline of fuel is supplied from the intake valve 105 and introduced into the pressurizing chamber 112. The gasoline is pressurized in the pressurizing chamber 112, whereby the gasoline flows outside through a diametral gap between a slide hole 108a at an inner diameter portion of the cylinder 108 and the plunger 102 sliding therein. The leakage of gasoline is minimized by sealing the diametral gap with a seal 120.

States of wear due to slide between the cylinder and plunger, and between the plunger and seal are the same as in the embodiment 1. As countermeasures to wear of the seal 120 (elastic member, for example rubber) and the plunger 102 and wear of the plunger 102 and the slide hole 108a of the cylinder, the plunger 102 has a surface treatment layer 102a composed of a diffusion surface treatment layer and a corrosion resistant and wear resistant hard film formed thereon.

In the present embodiment, the surface treatment layer 102a of the plunger 102 is composed of a corrosion resistant and wear resistant hard film as shown in FIG. 5(a) and a diffusion surface treatment I. A base material is alloy tool steel JIS SKD11 and the diffusion surface treatment layer I has a nitride layer of 100 $\mu$m formed as shown in FIG. 10(b). CrN of 5 $\mu$m is formed on the surface by the treatment apparatus in FIG. 11.

In the present embodiment, the seal 120 made of elastic material is provided on the outer peripheral portion of the plunger 102 to prevent oil for lubricating the cam 200 from flowing in the pump and prevent fuel in the pump from flowing outside. In the present embodiment, the seal 120 is formed with a metal tube 120a as one piece, and press-fitted in the pump body 100. Any fixing methods can be used.

Further, the pressurizing chamber 112 is formed by the cylinder 108 having the slide hole reciprocatably supporting the plunger 102. The inner diametric portion of the cylinder 108 is composed of an extension inner wall 108b forming the pressurizing chamber and the slide hole 108a with a diametric gap of 10 $\mu$m or less between the plunger 102, minimizing fuel leakage from the pressurizing chamber.

Further, in an outer peripheral portion of the cylinder 108, a vertical passage 109 communicating with the slide hole 108a is provided, and the vertical passage 109 is fluidly connected to the intake passage 110 communicating with the fuel introduction port 110 by a lateral passage 110b.

A check valve 400 for restricting a flow direction from the fuel inlet passage 110 side to the vertical passage 109 side is provided at an inlet of the lateral passage 110b.

Thereby, fuel flowing from the pressurizing chamber 112 through the diametric gap between the slide hole 108a and the plunger 102 can be allowed to be flow into the side of the fuel intake passage 110 which is a low pressure portion, so that the pressure of the seal 120 on the fuel chamber side becomes the same as the pressure in the fuel intake passage 110, and it is possible to prevent the fuel from leaking outside without increasing greatly the rigidity of the seal 120.

Further, as mentioned above, since the outflow of fuel in the pressurizing chamber 112 through the gap of the plunger slide portion can be suppressed to be minimum, it is possible to improve the delivery efficiency of the pump during normal operation.

In the present embodiment, main members or parts working in fuel, sliding, and required for corrosion resistance and wear resistance are the intake valve and delivery valve 106 provided on the fuel intake passage 110 and the delivery passage 111, the plunger 102 of pressurizing member of the pressurizing chamber 112 and the cylinder 108 having the slide bore supporting the plunger so as to be able to reciprocate.

Particularly, the diametric gap between the plunger 102 and the cylinder 108 is made 10 $\mu$m or less to minimize leakage of fuel from the pressurizing chamber. Therefore, fixing or sticking due to seizure, or reduction of the pump performance due to an increase of the diametric gap due to abnormal wear, etc. occurs.

Figure 19:
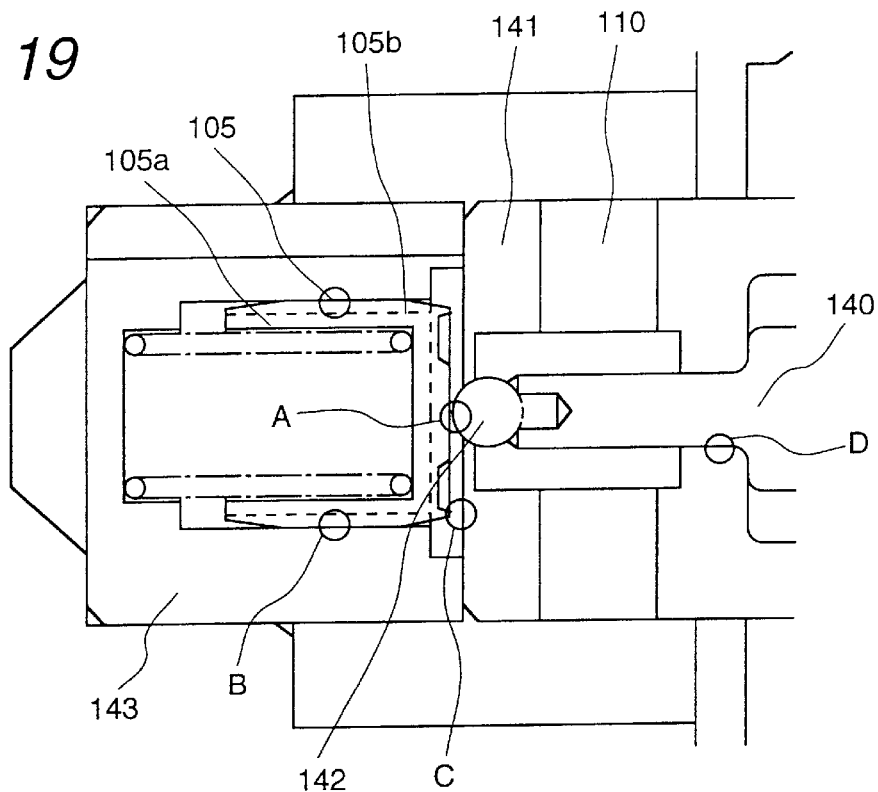
FIG. 19 is a sectional view enlarged in part showing a surface treatment layer of the intake valve of FIG. 16.
Figure 20:
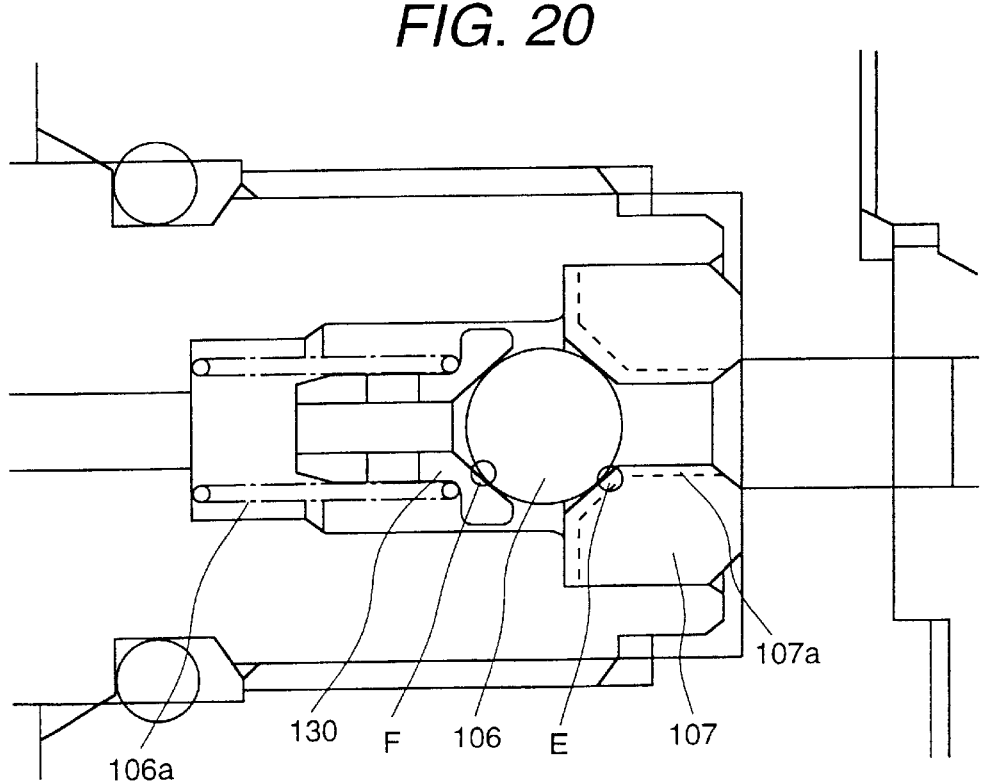
FIG. 20 is a sectional view enlarged in part showing a surface treatment layer of a delivery valve in FIG. 16 in the second embodiment.

Next, application of the present embodiment to the other wearing parts is shown. FIG. 19 and FIG. 20 show details of part of the intake valve 105 and details of part of the delivery valve 106, respectively.

In the intake valve 105 of FIG. 19, fuel is supplied through the fuel supply port 110, and taken in the pressurizing chamber 112 through a gap between a ball 142 and the intake valve 105 when a plunger rod 140 reciprocates. In such a case, positions at which wear becomes a problem are as follows; A: a contact portion between the ball 142 and the intake valve 105, B; a slide portion between the intake valve 105 and a check valve guide 143, C; a seat portion of the plunger guide 141 and the intake valve 105, and D; a support portion of the plunger rod 140.

Around the delivery valve 106 of FIG. 20, fuel is pressurized in the pressurizing chamber 112 to open and close the delivery valve 106, thereby to be delivered. In such a case, portions at which wear becomes a problem are as follows; E; a contact portion between the check valve seat 107 and the delivery valve 106 and F; a contact portion between the delivery valve 106 and a check valve holder 130.

In order to take measures to wear in each of such portions, a surface treatment layer composed of a diffusion surface treatment layer and a corrosion resistant and wear resistant hard film is formed on each portion.

In the present embodiment, the surface treatment layers 105a, 107a each composed of a corrosion resistant and wear resistant hard film as shown in FIG. 5(a) and a diffusion surface treatment I are formed on the intake valve 105 in FIG. 19, and the check valve seat 107 in FIG. 20. A base material is stainless steel JIS SUS420J and the diffusion surface treatment layer I has a nitride layer of 50 μm formed and CrN of 5 μm is formed on the surface by the treatment apparatus in FIG. 11.

Durability test of the radial plunger pump to be practiced of FIG. 16 in which the inside of the fuel chamber is constructed as in the above was conducted.

As a result, the pump worked without abnormality, a stable value of gasoline delivery flow performance was obtained. After, the test, the pump was disassembled, and each part inside the fuel chamber were examined, as a result, abnormal wear did not occur in any of the parts and the parts were in steady wear state. Further, in the intake valve 105 and the delivery valve 106, wear of parts at wearing positions was small.

On the other hand, without any treatment, a little wear occurred in slide portions between the outer diameter portion of the plunger 11 and the seal 17.

In the fuel pump constructed according to the present invention, slide parts are difficult to adhere each other, and the wear resistance is improved. Since a surface treatment layer composed of corrosion resistant and wear resistant film and a diffusion surface treatment layer is formed even under high surface pressure, it is difficult to be separated and has a property excellent in corrosion resistance. The wear resistance under severe circumstances is improved by those properties and a fuel pump of the object can be provided.

Embodiment 3

Figure 21:
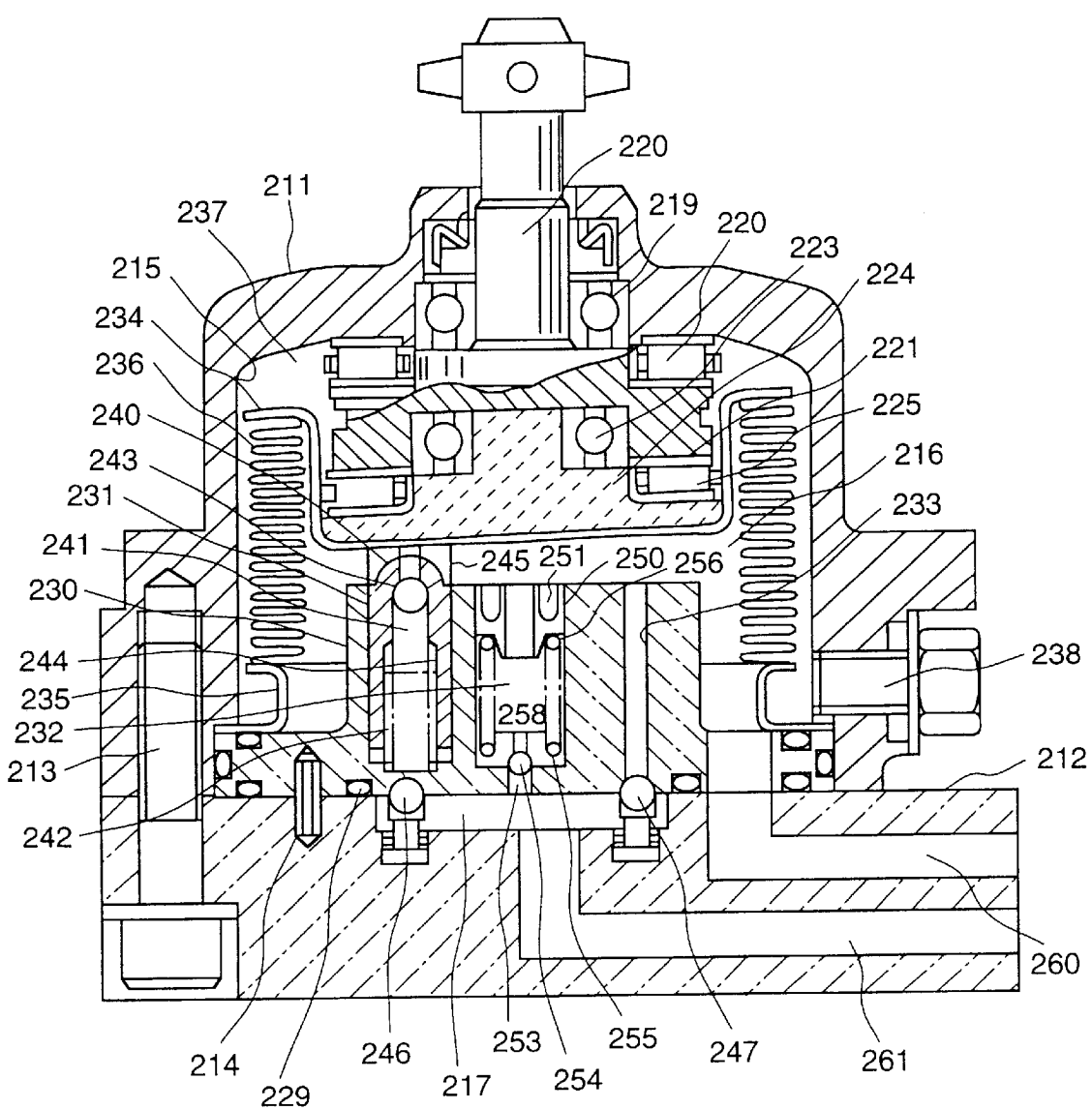
FIG. 21 is a sectional view of a fuel pump of an embodiment of the present invention.

FIG. 21 is a sectional view of a swash plate type axial plunger high pressure fuel pump of another embodiment of the present invention.

In FIG. 21, a housing is composed of a first housing 211 and a second housing 212, and the housings are integrated by bolts 213. An inside of the housing is made into a crank chamber 215, in which an intake chamber 216 of gasoline and a pressure chamber 217 of high pressure are formed as described later. A bearing 219 is provided at an upper end of the first housing 211, and a driving shaft 220 is supported by the bearing 219. The driving shaft 220 is connected to an engine cam (not shown) and driven as well known. On one end of the driving shaft 220, a swash plate 221 is mounted to make a slide motion by rotation of the shaft 220 and axially supported by a thrust bearing 222 mounted between the swash plate and an inner face of the housing. A bearing 223 is provided in a recess formed inside the swash plate 221, and a part of a swing plate 224 is received in the recess to be supported by the bearing 223.

The swing plate 224 is coupled with the swash plate 221 through the radial bearing 223 and the thrust bearing 225. The swing plate 224 is swung by rotation of the swash plate 221 caused by rotation of the driving shaft 220.

A cylinder block 230 is arranged opposite to the swing plate 225 with spacing therebetween, provided with five plungers 231, a pressure regulator 232 and a pressure release hole 233 and integrated with the second housing 212 by bolts 214.

An upper bellows cap 234 is fixed to the swing plate 224 and a lower bellows cap 235 is fixed to the cylinder block 230. A bellows 236 is held by the upper and lower bellows caps 234 and 235. The bellows separates a mechanism chamber 237 containing a mechanism part converting rotation of the driving shaft 220 in the crank chamber 215 from the intake chamber 216 filled with gasoline to be delivered. In the mechanism chamber 237, oil or grease for lubrication of the mechanism part is sealed. A reference number 238 denotes an oil plug which is mounted after filling of oil.

The plungers 231 each are composed of a plunger head 240 in a cylinder, upper and lower springs 241 and 242, a ball 243 and a spring stainer 244, and slippers 245 each having a shape suited with a spherical tip of the plunger head are arranged. Each plunger head 240 has a hole axially perforated therein and communicating with the pressure chamber 217 through a passage inside each plunger 231. At an outlet of the passage to the pressure chamber 217, a hole and a check valve 246 choking the hole by a ball are formed in the cylinder block 230. Therefore, gasoline filled in the intake chamber 216 is transmitted through the groove formed in the slipper 245 and the passage of the plunger and delivered into the pressure chamber 217 by pressing down the check valve 246. In this case, the operation is effected every the five plungers in turn. For safety, a similar check valve 247 made so as to choke a hole formed in the cylinder block by a ball is provided on the pressure release hole 233.

The pressure regulator 232 is composed of a fixing member 251 disposed inside the cylinder 250 formed in the cylinder block 230, having a communication hole formed therein and fixed to the block 230 with the position relative to the cylinder block 230 being adjusted by a screw mechanism and a rotation mechanism rotating it, a pressure relief ball valve 254 for closing/opening a valve hole 253 communicating the cylinder 250 and the pressure chamber 217, a retainer 255 for the pressure relief ball valve 254, and a spring 256 arranged between the retainer 255 and the fixing stage 251 so as to pressing them. The pressure relief ball valve 254 has a ball contacting with a seat surface of the valve hole 253, the ball is held by a concave portion provided in the retainer 255. The retainer 255 has a communication hole 258 formed therein. Gasoline can flow in a gap between the retainer 255 and a surface of the cylinder 250.

The pressure relief ball valve 254 repeats closing and opening according to swinging of the swing palate 224, gasoline is delivered into the pressure chamber 217. In this case, the delivery is on-off-controlled.

By a feed pump (not shown) provided inside a fuel tank (not shown), gasoline having pressurized 0.3 MPa is taken in the intake chamber 216 through an intake passage 260, pressurized to a pressure more than 3 MPa and delivered into the pressure chamber 217 of high pressure. Gasoline delivered in the pressure chamber 217 is led to the engine (not shown) through a delivery passage 261.

In the present invention, slide portions are the swing palate 224 and slipper of a portion converting swing motion into reciprocation, the slipper 245 and plunger 231 (plunger head 240), and the plunger 231 and the cylinder 229 of a plunger portion reciprocating, the material structures are as follows.

The swing plate 224 and the slipper 245 slides each other on a flat surface and gasoline is supplied through the groove formed in the slipper 245. The swing plate 224 is made of material, the hardness of which is harder than or substantially equal to the slipper 245.

The slipper 245 and the plunger 231 are in a point contact with each other at the concave spherical portion of the slipper 245 and the convex spherical portion of the plunger head 240, so that this contact portion becomes high in surface pressure. Gasoline is supplied through the communication passage provided in the slipper 245. The slipper 245 is made of material the hardness of which substantially equal to or softer than the plunger head 240.

The plunger 231 and the cylinder 229 are arranged to slide with a gap of several $\mu$m or so between the outer diametric surface of the plunger 231 and the cylinder 229. Gasoline is supplied to the slide portion from the side of plunger head 240.

As base materials of the swing plate 224, slipper 245, plunger 231 and cylinder 229, martensite stainless steels JIS SUS440C, JIS SUS420J2 and JIS SUS403 can be used through quenching and tempering. Alloy tool steels JIS SKD61, JIS SKD11 also can be used through quenching and tempering. As surface treatment of those materials, nitriding is performed.

The JIS SUS440C and JIS SUS420J2 are quenched and tempered so that the hardness of base material is 500–600 Hv. The materials are excellent in corrosion resistance because of stainless steel.

Since the material JIS SUS403 is small in carbon content, even if quenching and tempering are performed, the hardness is about 300 Hv or so and soft. Therefore, nitriding is applied as surface treatment to raise wear resistance.

However, the material JIS SUS403 is soft at 190 Hv or less in refined base material before quenching and tempering for improvement of wear resistance, so that it is excellent in reducibility, and it is able to be plastically reduced in a low temperature region and formed in product shapes by press working or the like. Therefore, it is excellent in productivity. On the other hand, since the hardness of the base material is soft, 190 Hv or less, the wear resistance is less. Therefore, nitriding is applied because it is necessary to provide the wear resistance.

Since about 13% of Cr of a nitride forming element is added to alloy compositions of the material JIS SUS403, the hardness of a nitride layer becomes 1000 Hv or more by general nitriding. In a distribution of the hardness, a change in hardness is small inside the nitride layer and the hardness sharply decreases at the boundary and becomes the hardness of the base material.

The alloy tool steels JIS SKD61 and JIS SKD11 can be raised in hardness by quenching and tempering. Therefore, the materials have strength and durability even under a high surface pressure and they also have a good wear resistance.

The alloy tool steels each have a nitride forming element, Cr of about 5–13%, so that the hardness of a nitride layer becomes 1000 Hv or more by general nitriding and a hard surface layer can be provided by the nitriding. In a distribution of the hardness, the hardness is high at the surface and decrease gradually toward inside. However, in the material JIS SKD11, the hardness of base material is slightly lowered by heat history of nitriding.

Next, application examples of surface treatment of each part will be described.

Surface treatment applied in the present invention is nitriding. General nitriding methods known at present are as follows:

(1) A gas nitriding method of generating active N by catalytic reaction of $NH_3$ gas on a surface of steel heated in a temperature region of 600° C. or less, and diffusing it into the inside; and (2) A plasma nitriding method of arranging, as cathode, an object to be treated inside a pressure-reduced container (anode), introducing therein nitrogen source gas ($N_2$) and dilution gas ($H_2$), applying high voltage to generate DC discharge, and diffusing N ionized by plasma to the inside.

An example of compounds of surface layers formed by those nitriding methods is shown in FIG. 7. Sample is JIS SUS403 of martensite stainless steel and nitriding was performed. Compounds identified at the most surface portion are $Fe_2N$ and $Fe_3N$ each of which is a $\epsilon$ phase called a white compound of Cr nitride, $Fe_4N$ of $\gamma'$ phase and CrN of Cr nitride. Here, the $\epsilon$ phase of white compound is brittle, so that it is worn by sliding or the like, separates from the surface and falls as worn power which effects grinding action. Therefore, from a viewpoint of wear resistance, it is general to use by removing the most surface portion of about 10 $\mu$m by grinding or the like.

However, in a case of complicated shape such as the spherical surface side of the slipper 245 in the present embodiment, man hours are taken to precisely remove the most surface portion of about 10 $\mu$m, which also is a problem of cost. Therefore, after working of the most surface portion after nitriding is not done or limited to minimum reduction by a simple reduction method such as barrel grinding.

On the other hand, as mentioned above, for each of sliding parts which are the swing plate 224, slipper 245, plunger 231 and cylinder 229, there is a suitable hardness value when they are combined for their role. Therefore, when the sliding pars of respective materials are subjected to nitriding, the hardness of nitride layers of respective parts is necessary to be controlled so as to be suited to the respective parts.

The hardness of a nitride layer becomes 1000 Hv or more and nearly saturated when a nitride forming element of alloy elements of the material (for example Cr, Al, V, Mo, Ti, etc.) is added more than a certain amount. Further, in the same material, as a treatment temperature becomes higher, precipitated nitride becomes larger in size and lower in hardness. By using this phenomenon, it is possible to control the hardness of a nitride layer by controlling treatment temperature. However, although the hardness of the nitride layer can be controlled, the $\epsilon$ phase of white compound at the most surface portion grows to be thick when the treatment temperature becomes high, which is not preferable. Further, in the gas nitriding method, the treatment is difficult in a temperature range of 600° C. or more because of its apparatus. Therefore, in the gas nitriding method, a range in which the hardness can be controlled is limited, Therefore, it is necessary to consider a treatment process in which the hardness of a nitride layer can be controlled in a wider range.

Therefore, in the embodiment of the present invention, the object to control the hardness of a nitride layer is attained by performing a diffusion treatment after nitriding.

In the present embodiment, also, a treatment to control the hardness of a nitride layer in a manner similar to in FIG. 9 is performed. In this case, as nitriding in a treatment process, it also is possible to apply a gas nitriding method. However, a plasma nitriding which is able to control compounds of a surface layer by gas compositions is more suitable.

In (a) treatment process, nitriding and diffusion processes are performed continuously. In the embodiment, the process is performed by a plasma nitriding. In the plasma nitriding, since a pressure-reduced container is cooled, a product to be treated can be heated and held randomly to a temperature by input power (discharge power). Further, it has a feature that the atmosphere can be turned into nitriding atmosphere or non-nitriding atmosphere (diffusion) by controlling gas compositions. On the other hand, since in the gas nitriding method it is difficult to treat in a temperature range of 600° C. or more because of its apparatus as mentioned above, a diffusion treatment more than about 600° C. is a problem.

In (b) treatment process, the nitriding and diffusion processes are conducted noncontinuously. In the embodiment, the nitriding is effected by a plasma nitriding. In the diffusion process heating and holding are effected in a vacuum heat treatment furnace. Other than the treatment, a treatment in a heat treatment furnace of non-oxidizing atmosphere, for example inert gas such as $N_2$, Ar, etc. also can be used.

Figure 22:
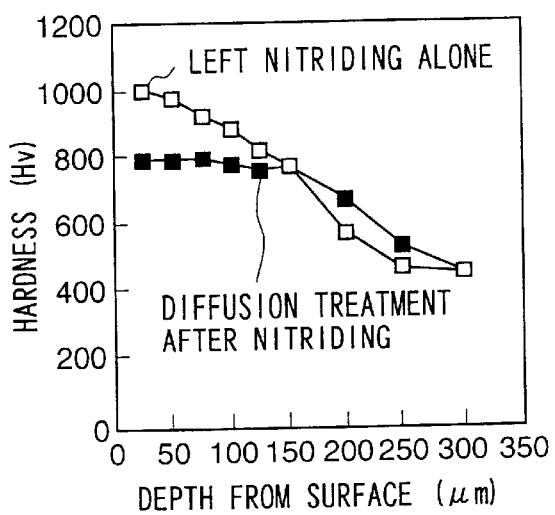
FIG. 22 is diagrams showing hardness of nitride layers in FIG. 21.
Figure 22:
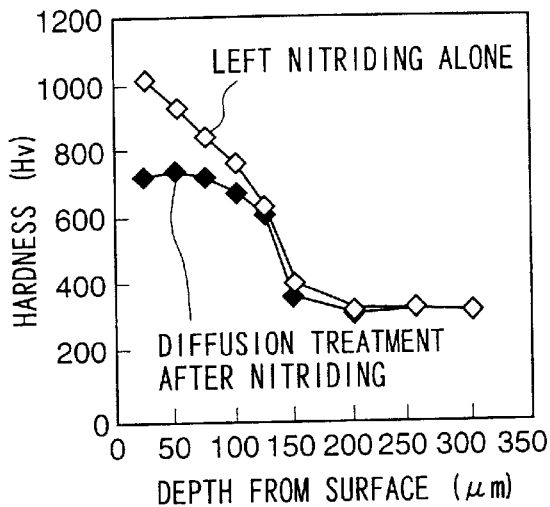
Figure 22:
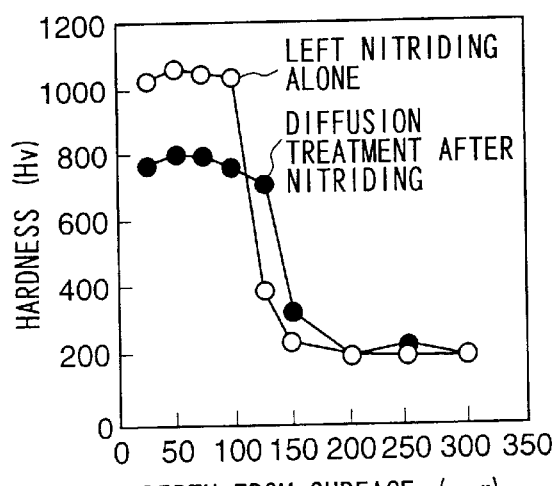

FIG. 22 shows graphs which are hardness distributions of nitride layers of various kinds of steels used in the embodiment of the present invention. As an example, martensite stainless steels JIS SUS420J2, JIS SUS403 are treated in a process (a), and an alloy tool steel JIS SKD61 is treated in a process (b). In such a case, they are the hardness distributions that treatment conditions, temperature and time in each process are studied aiming at surface hardness of 750+−50 and case depth of 0.1 mm (500 Hv or more).

As for the above nitriding, a plasma nitriding is taken in any cases. The treatment conditions are as follows: temperature; 530° C., time; 5 hours, gas compositions; $N_2/H_2$ 1/3, pressure (Pirani); 40 Torr. In hardness distributions without any treatment not done after nitriding (left nitriding alone), the hardness of each kind of steel at a position of 25 μm from the surface is 1000 Hv, gradually decreases from the surface toward an interior and becomes equal to the hardness of the base material. The following diffusion process is performed for each kind of steel.

Material JIS SKD61 was subjected to heat treatment by a vacuum heat treatment furnace under the conditions of pressure of $1\times10^{-5}$ Torr, temperature of 630° C. and time of 3 hours.

Material JIS SUS420J2 was subjected to plasma nitriding under the conditions of temperature of 590° C., time of 3 hours, gas compositions of only $H_2$ and pressure (Pirani) of 40 Torr. Material JIS SUS403 was subjected to plasma nitriding under the conditions of temperature of 610° C., time of 5 hours, gas compositions of only $H_2$ and pressure (Pirani) of 40 Torr.

In hardness distributions of materials subjected to diffusion process after nitriding, although the hardness of the material on which any treatment was not done after nitriding is about 1000 Hv, the hardness of the material processed by nitriding and then diffusion is reduced to 700–800 Hv at the surface and gradually decreases toward an inside and becomes equal to the hardness of the base material. The materials satisfy the target of surface hardness of 750 Hv+−50 Hv and case depth of 0.1 mm (500 Hv or more).

As a result of analysis of a surface layer produced by the treatment in which a nitride layer depth is controlled by diffusion after nitriding in the same manner as in FIG. 7, the compounds identified at the surface are CrN of Cr nitride and α-Fe of base material. Comparing with the case of any treatment not done after nitriding in FIG. 3, it is noted that $Fe_2N$ and $Fe_3N$ each of which is a e phase called a brittle white compound affecting the wear resistance and $Fe_4N$ of γ' phase disappear and do not exist by diffusion after nitriding.

From the results, according to the treatment applied in the present invention in which nitride layer hardness is controlled, a nitride layer controlled in hardness and having toughness is formed. Further, compounds of the surface layer also can be controlled. Therefore, it is unnecessary to grind a surface of brittle ε phase and it is possible to supply even with the nitride layer as it is. However, in the case of plasma nitriding, fine particles of about 1–2μm or so are deposited on a surface as a film by a sputtering phenomenon. It is desirable to lap the surface, taking a bad influence of the fine particles on initial wear into consideration.

Figure 23:
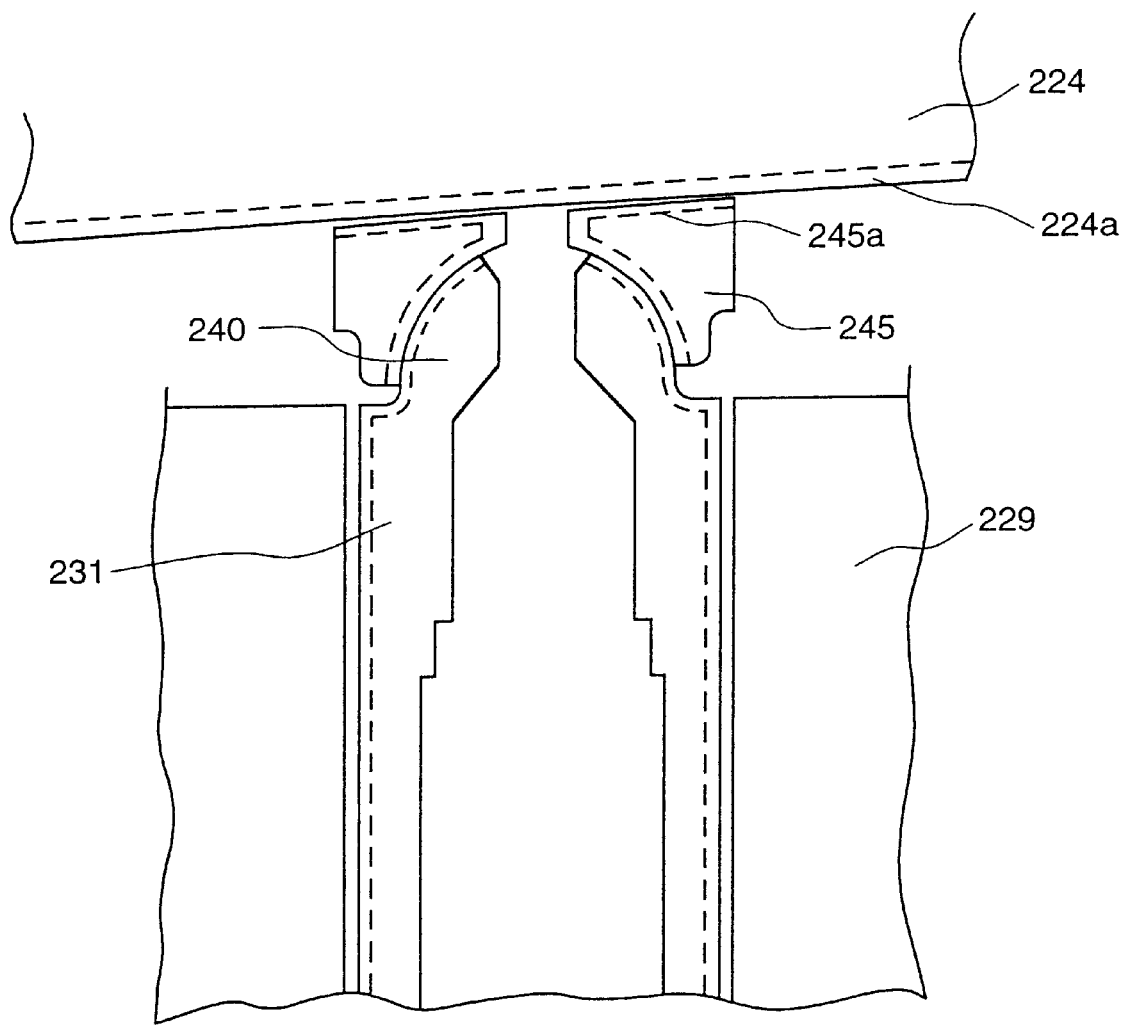
FIG. 23 is a sectional view enlarged in part showing a surface treatment layer in FIG. 21.

FIG. 23 is a sectional view of a slipper and plunger in which nitride layer hardness is controlled treatment is applied to the slipper 245. Materials and specification of the swing plate 224, slipper 245, plunger 231 (plunger head 240) and cylinder 229 are as follows.

As for the swing plate 224, in order to make the hardness thereof harder than the slipper 245, a plasma nitriding is applied to material JIS SUS403 to form a nitride layer 24a. The treatment conditions are as follows: temperature; 530° C., time; 7 hours, gas compositions; $N_2/H_2=1/3$, pressure (Pirani); 40 Torr. A case depth (depth of hardening) is 0.1 mm (500 Hv or more). The surface is ground 20 μm after nitriding to remove an ε phase of brittle while compound which as a bad influence on the wear resistance. Further, as material of the swing plate 224 other than the above, quenched and tempered material of JIS SUS 420J2, JIS SUS440C and quenched and tempered material of JIS SKD61, JIS SKD11 are used and nitriding is applied according to an object of combination.

The hardness of the slipper 245 is lower than the swing plate 224 and a treatment process (a) controlling nitride layer hardness, shown in FIG. 9 is applied. Material JIS SUS403 is used as base material and a nitride layer 45a is formed under the same treatment condition and nitride layer specification as in FIGS. 9 and 22. In the nitride layer 45a, surface hardness is 750 Hv+−50 Hv and depth of hardening is 0.1 mm (500 Hv or more). Removal of fine particles on the most surface portion and lapping for improving surface smoothness are effected after nitriding. Further, as material of the slipper 45 other than the above, quenched and tempered material of JIS SUS420J2, JIS SUS440c and quenched and tempered material of JIS SKD61, JIS SKD11 also are used and the above-mentioned nitriding is applied thereto for supply according to an object of combination.

For the plunger 231 (plunger head 240), quenched and tempered material JIS SUS440C is used. The outer diametric surface of the plunger 231 and the plunger head 240 are ground in view of wear resistance. Further, as material of the plunger 231 (plunger head 240) other than the above, quenched and tempered material of JIS SUS420J2, JIS SUS440c and quenched and tempered material of JIS SKD61, JIS SKD11 also are used and the above-mentioned nitriding is applied thereto for supply according to an object of combination.

For the cylinder 229, quenched and tempered material JIS SUS420J2 is used. The inner diametric surface of the cylinder 229 is ground in view of wear resistance. Further, as material of the cylinder 229 other than the above, quenched and tempered material of JIS SUS420J2, JIS SUS440c and quenched and tempered material of JIS SKD61, JIS SKD11 also are used and the above-mentioned nitriding is applied thereto for supply according to an object of combination.

Further, in the present embodiment, an ion nitride layer is formed on the surface of the plunger 131 in the same manner as in the embodiments 1 and 2, then diffusion treatment is performed, and then films of CrN, TiN, BN, TiC, SiC of thickness of 1–5 μm are formed on the surface.

Durability test of a real machine of the swash plate type axial plunger pump in FIG. 21 with the above-mentioned construction, was conducted.

As a result, the fuel pump works without any abnormality, and stable values of gasoline delivery flow test are obtained.

After the test, the pump is disassembled and each part is examined. As a result, occurrence of any abnormal wear is not observed in any parts, and wear is in a stable condition.

On the other hand, in a pump without any treatment as above-mentioned, abnormality occurred in gasoline delivery flow performance during the durability test, and running could not be continued. As a result of disassembling and examination of the pump after the test, a lot of wear was observed in the swing plate 224 and a stepped portion was found. Further, in the spherical portion of the slipper 245 and plunger head 240, thickness reduction occurred by wear. Powder by the wear entered a gap between the outer diametric surface of the plunger 231 and the inner diametric surface of the cylinder 229, whereby abnormal wear occurred.

From the above-mentioned results, in the fuel pump constructed according to the present invention, a nitride layer, and a nitride layer and wear resistant layer each are harder than the hardness of base material, it is not easy to adhere and reactivity between slide parts is improved. Further, the nitride layer is a treatment layer continued from the base material, so that the layer has a property not to be easily separated. The wear resistance and corrosion resistance are improved and a high pressure fuel pump of the object can be made by those properties.

Embodiment 4

FIG. 24 is a schematic diagram of a gasoline direct injection internal combustion engine for a vehicle, using the fuel pump of any one of the embodiments 1 to 3. An fuel injection valve 61 provided in a cylinder head 70 is opened at its tip so as to directly inject fuel supplied from a fuel gallery into a combustion chamber 74. In the present embodiment, the engine is provided with the high pressure fuel pump for supplying fuel to the fuel injection valve to directly inject fuel into the cylinder while making the fuel into super-fine particles for super-lean burn.

An ignition plug 63 is provided between an intake valve 64 and an exhaust valve 65, intake air taken in through an intake port 66 by action of a flat piston 68 during opening of the intake valve 64 and fuel injected from the injection valve 61 are mixed, and the mixture is ignited with electric spark to commence combustion. Combustion gas is exhausted through the exhaust valve 65 by action of the piston 68 during opening of the exhaust valve 65.

A fuel injection valve driving circuit 62 is electrically connected to a fuel injection valve driving signal terminal 71 of the fuel injection valve 61. The fuel injection valve driving circuit 62 is electrically connected to an electronic control unit (ECU) 69 which outputs a trigger signal for driving the fuel injection valve and a signal of driving or not driving the fuel injection valve so as to shorten delay in motion of the valve body. Various kinds of operation states of the engine are input into the electronic control unit 69, and a trigger signal for driving the fuel injection valve is determined according to the operation states.

A flow rate of air from the intake port 66 is controlled by electromagentic means M arranged at two positions and linked with an accelerator pedal. Exhaust gas after combustion is passed through a low oxygen storage type three-way catalyzer 72 by which hydrogen carbon, carbon monoxide and NOx are removed, and through a lean NOx catalyzer 73 by which NOx is removed. In the present embodiment, fuel is injected from the fuel injection valve 61 into the cylinder by being made into gas liquid superfine particles of particle diameter of 25 $\mu$m or less, preferably 15 $\mu$m or less, more preferably 10 $\mu$m or less, and the engine is driven under super-lean burn at air fuel ratio of 50.

The three-way catalyzer 72 used here comprises an alumina carrier, Pt and Ce supported on the carrier, and the NOx catalyzer 73 used here comprises an alumina carrier, Pt, and oxides of Na, Ti supported on the carrier.

The whole construction of the fuel injection valve 61 is as follows. The fuel injection valve 61 is mounted on a cylinder head 70 and fixed to the housing. The fuel injection valve comprises a core, a coil assembly, an armature and a swirl valve device supported on one end of the housing by calking. The valve device is composed of a cylindrical hollow stepped valve body having a small diameter cylinder portion and a large diameter cylinder portion, a valve seat fixed to a central hole tip inside the valve body and having a fuel injection hole, and a needle valve of a valve body driven by a solenoid valve so as to contact and separate from the valve seat to close and open the fuel injection hole. It has two O-rings arranged on the fuel pressure application side and contacting with a lower end surface of the coil assembly in a space enclosing the above-mentioned housing and core. A diameter of the fuel injection hole is 0.8 mm.

Next, an operation is explained. Upon current passage to the coil, flux is generated in a magnetic circuit formed by the armature, core and housing, so that the armature is attracted to the core side, and the needle valve integrated with the armature is separated from the valve seat to form a gap. Upon the formation of the gap, fuel of high pressure enters the injection hole of the valve seat from the valve body, and injected from an outlet at its tip while being made ultra-fine as mentioned above.

The fuel injection valve 61 protrudes 2–10 mm inside the cylinder of the cylinder head.

Particularly, the valve body, valve seat, needle valve and swirler each are made of 1% C, 16% Cr ferrite stainless steel of JIS standard SUS44C, through annealing after cold plastic reduction and through machining it to form a final product shape. The diameter of the fuel injection hole is 0.8 mm and the degree of circularity is 0.5 $\mu$m or less.

A method of forming an organic film on a tip portion of the fuel injection valve 61 and its effect are explained hereunder.

The present embodiment is a fuel injection valve having an organic film of depth 1.5–8 nm formed in the fuel injection hole and its peripheral portion, having an organic film formed on a surface of the fuel injection hole, wherein at least one of the following conditions is included; the fuel injection hole has such a diameter that fuel can be sprayed in particle diameter of 2 $\mu$m or less, the diameter of the injection hole is 0.3–0.8 mm, and the fuel injection hole and its peripheral portion are made of ferrite stainless steel containing by weight 0.6–1.5% C, 1% or less Si, 1.5% or less Mn and 15–20% Cr.

The organic film is bonded with the base metal by covalent bond, the thickness is preferably 105–30 nm, more preferable 1.5–10 nm and most preferable 1.5–7 nm.

Further, as the organic film, a film formed under grow discharge of perfluoropolyether compound, tetrafluoreethylenemonomer, silicon resin, polyamide resin, etc. and a film obtined by teflon resin, a solution of alkoxide and fluoalkylradical-substituted-alkoxide can be used.

In the present embodiment, in an in-cylinder direct injection type internal combustion engine provided with a cylinder head having an intake means and an exhaust means in the combustion chamber, a piston reciprocating inside the cylinder head, a fuel injection means arranged so as to inject fuel into the combustion chamber and an igniting means for igniting fuel injected from the fuel injection means, the above-mentioned fuel pump and the above-mentioned fuel injection valve can be used.

Further, in the present embodiment, in an in-cylinder direct injection type internal combustion engine provided with a cylinder head having an intake means and an exhaust means in the combustion chamber, a piston reciprocating inside the cylinder head, a fuel injection means arranged so as to inject fuel into the combustion chamber for lean burn control at an air fuel ratio of 45 or more and an igniting means for igniting fuel injected from the fuel injection means, the above-mentioned fuel injection means has an organic film formed on surfaces of an injection hole jetting the fuel and a peripheral portion of the hole and the above-mentioned fuel pump is used.

According to the present embodiment, deposits due to combustion of gasoline can be prevented from adhering on the surface of the fuel injection valve of the direct injection engine, particularly, control of super-lean burn at a air fuel ratio of 45 or more is possible and a vehecle or automobile of high fuel comsuption efficiency can be obtained.

According to the present invention, in a fuel pump, a wear resistance/corrosion resistance film is formed on each sliding mechanism part, considering slide parts in fuel, particularly, material structure and combination, whereby seizure and abnormal wear can be prevented. Thereby, a high pressure fuel pump of high reliability can be provided, so that a remarkable effect is exhibited, particularly, in direct injection inside the cylinder of an automobile engine for lean burn control combustion.

What is claimed is:

1. A fuel pump pressurizing and supplying fuel to a fuel injection valve of a vehicle engine, wherein a surface-hardened layer comprising one of a nitride layer, a carburized and quenched layer and a carbonitrided layer, and a metal compound layer formed on said surface-hardened layer and having a higher corrosion resistance to the fuel than the surface-hardened layer is formed on at least one of sliding surfaces contacting with each other and sliding through the fuel.

2. An in-cylinder direct injection type internal combustion engine comprising fuel injection means for directly injecting fuel into a combustion chamber and a fuel pump supplying the fuel to said fuel injection means, wherein said fuel pump is a fuel pump according to claim 1.

3. An in-cylinder direct injection type internal combustion engine according to claim 2, wherein said fuel injection means injects fuel of an air fuel ratio of 45 or more for lean burn control.

4. A fuel pump, comprising, inside a housing, a shaft transmitting rotation from outside, a swash plate converting rotation of said shaft into a swinging motion and a plunger reciprocated in a cylinder by the swinging motion of said swash plate through a slipper, and pressurizing fuel and supplying the fuel to a fuel injection valve of a vehicle engine, wherein a surface-hardened layer comprising one of a nitride layer, a carburized and quenched layer and a carbonitrided layer, and a metal compound layer formed on said surface-hardened layer and having a higher corrosion resistance to the fuel than the surface-hardened layer is formed on at least one of sliding surfaces of said plunger and cylinder, contacting with each other and sliding.

5. An in-cylinder direct injection type internal combustion engine comprising fuel injection means for directly injecting fuel into a combustion chamber and a fuel pump supplying the fuel to said fuel injection means, wherein said fuel pump is a fuel pump according to claim 4.

6. A fuel pump, comprising, inside a housing, a swash plate rotating through a shaft transmitting rotation from outside, a swing plate swinging by rotation of said swash plate and a plunger reciprocating in a cylinder through a slipper by rotation of said swing plate, and pressurizing fuel and supplying the fuel to a fuel injection valve of a vehicle engine, wherein a surface-hardened layer comprising one of a nitride layer, a carburized and quenched layer and a carbonitrided layer, and a metal compound layer formed on said surface-hardened layer and having a higher corrosion resistance to the fuel than the surface-hardened layer is formed on at least one of sliding surfaces of said plunger and cylinder, contacting with each other and sliding.

7. An in-cylinder direct injection type internal combustion engine comprising fuel injection means for directly injecting fuel into a combustion chamber and a fuel pump supplying the fuel to said fuel injection means, wherein said fuel pump is a fuel pump according to claim 6.

8. A fuel pump pressurizing and supplying fuel to a fuel injection valve of a vehicle engine, wherein a surface-hardened layer comprising one of a nitride layer, a carburized and quenched layer and a carbonitrided layer, and a metal compound layer formed on said surface-hardened layer and having a higher corrosion resistance to the fuel than the surface-hardened layer is formed on at least one of sliding surfaces contacting with each other and sliding through lubrication oil.

9. An in-cylinder direct injection type internal combustion engine comprising fuel injection means for directly injecting fuel into a combustion chamber and a fuel pump supplying the fuel to said fuel injection means, wherein said fuel pump is a fuel pump according to claim 8.

10. A fuel pump pressurizing and supplying fuel to a fuel injection valve of a vehicle engine, wherein a surface-hardened layer comprising one of a nitride layer formed by nitriding and then diffusion treatment and a carbonitrided layer, and a metal compound layer formed on said surface-hardened layer and having a higher corrosion resistance to the fuel than the surface-hardened layer are formed on at least one of sliding surfaces contacting with each other and sliding through the fuel.

11. A fuel pump pressurizing and supplying fuel to a fuel injection valve of a vehicle engine, wherein a surface-hardened layer comprising $Fe_4N$ and CrN, and a metal compound layer formed on said surface-hardened layer and having a higher corrosion resistance to the fuel than the surface-hardened layer are formed on at least one of sliding surfaces made of one of stainless steel and alloy tool steel and contacting with each other to slide through the fuel.

12. A fuel pump pressurizing and supplying fuel to a fuel injection valve of a vehicle engine, wherein a surface-hardened layer comprising a carbonitrided layer of martensite structure, and a metal compound layer formed on said surface-hardened layer and having a higher corrosion resistance to the fuel than the surface-hardened layer are formed on at least one of sliding surfaces made of one selected from stainless steel and alloy tool steel and contacting with each other to slide through the fuel.

13. A surface treatment method for a fuel pump pressurizing and supplying fuel to a fuel injection valve of a vehicle engine, comprising the steps:

forming a surface-hardened layer of one of a nitride layer and a carbonitrided layer on at least one of sliding surfaces contacting with each other and sliding, by plasma nitriding;

performing diffusion treatment for removing an $\epsilon$ phase of white compound generated by the plasma nitriding; and then forming a metal compound layer of higher corrosion resistance to the fuel than said surface-hardened layer on said surface-hardened layer by a PVD method.

14. A surface treatment method according to claim 13, wherein said diffusion treatment is performed at a higher temperature than a treatment temperature of said plasma nitriding.

15. A surface treatment method for a fuel pump pressurizing and supplying fuel to a fuel injection valve of a vehicle engine, comprising the steps:

forming a surface-hardened layer having martensite structure on at least one of sliding surfaces made of one selected from stainless steel and alloy tool steel and contacting with each other and sliding through the fuel, by carburizing and quenching; and then forming a metal compound layer of higher corrosion resistance to the fuel than said surface-hardened layer on said surface-hardened layer by a PVD method.

* * * * *